United States Patent
Nowak et al.

(10) Patent No.: US 10,118,337 B2
(45) Date of Patent: Nov. 6, 2018

(54) ELECTROSTATIC 3-D PRINTER CONTROLLING LAYER TOPOGRAPHY USING AEROSOL APPLICATOR

(71) Applicant: Xerox Corporation, Norwalk, CT (US)

(72) Inventors: William J. Nowak, Webster, NY (US); Jorge A. Alvarez, Webster, NY (US); Robert A. Clark, Williamson, NY (US); Michael F. Zona, Webster, NY (US); Chu-heng Liu, Penfield, NY (US); Paul J. McConville, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 149 days.

(21) Appl. No.: 15/173,777

(22) Filed: Jun. 6, 2016

(65) Prior Publication Data

US 2017/0348906 A1 Dec. 7, 2017

(51) Int. Cl.
| | |
|---|---|
| *B29C 64/165* | (2017.01) |
| *B33Y 30/00* | (2015.01) |
| *B33Y 50/02* | (2015.01) |
| *B29C 64/393* | (2017.01) |
| *B29C 64/147* | (2017.01) |

(52) U.S. Cl.
CPC .......... *B29C 64/165* (2017.08); *B29C 64/147* (2017.08); *B29C 64/393* (2017.08); *B33Y 30/00* (2014.12); *B33Y 50/02* (2014.12)

(58) Field of Classification Search
CPC ........ B29C 64/165; B33Y 30/00; B33Y 50/02
See application file for complete search history.

(56) References Cited

U.S. PATENT DOCUMENTS

| | | |
|---|---|---|
| 6,775,504 B2 | 8/2004 | Godlove et al. |
| 6,969,160 B2 | 11/2005 | Lean et al. |
| 7,250,238 B2 | 7/2007 | Fromm et al. |
| 7,270,408 B2 | 9/2007 | Odell et al. |
| 7,764,005 B2 | 7/2010 | Xu et al. |
| 7,851,549 B2 | 12/2010 | Sacripante et al. |

(Continued)

OTHER PUBLICATIONS http://www.keyence.com/products/measure/laser-2d/lj-v/index.jsp. Accessed on May 10, 2016.
http://www.automationtechnology.de/cms/en/3d-sensors-for-scans-by-means-of-laser-triangulation/. Accessed on May 10, 2016.
http://www.micro-epsilon.com/laser-scanner/new-scanCONTROL-BL/index.html. Accessed on May 10, 2016.

(Continued)

*Primary Examiner* — Jacob T Minskey
*Assistant Examiner* — Melody Tsui
(74) *Attorney, Agent, or Firm* — Gibb & Riley, LLC

(57) ABSTRACT

A 3-D printer includes build and support material development stations that electrostatically transfer build material and support material to an ITB. The ITB transfers a layer of build and support material to a platen each time the platen contacts one of the layers on the ITB, to successively form a freestanding stack of the layers on the platen. A sensor is positioned to generate a topographic measurement of the layer on the platen, and an aerosol applicator is positioned to propel build and support material on to the layer on the platen. The aerosol applicator controls the build and support material being propelled, based on the topographic measurement from the sensor through a feedback loop, to adjust the amount and location of the build material and the support material propelled on to the layer, and thereby control the flatness of surface topology of the layers in the freestanding stack on the platen.

13 Claims, 27 Drawing Sheets

(56) References Cited

U.S. PATENT DOCUMENTS

| | | | |
|---|---|---|---|
| 8,470,231 B1 | 6/2013 | Dikovsky et al. | |
| 8,488,994 B2 | 7/2013 | Hanson et al. | |
| 9,023,566 B2 | 5/2015 | Martin | |
| 9,193,110 B2 | 11/2015 | Pridoehl et al. | |
| 2006/0092234 A1* | 5/2006 | Lean | B41J 2/17513 347/65 |
| 2012/0276233 A1 | 11/2012 | Napadensky | |
| 2013/0186558 A1* | 7/2013 | Comb | B29C 67/0051 156/277 |
| 2014/0134334 A1 | 5/2014 | Pridoehl et al. | |
| 2015/0024319 A1* | 1/2015 | Martin | G03G 9/08791 430/108.22 |
| 2015/0142159 A1 | 5/2015 | Chang | |
| 2015/0145174 A1 | 5/2015 | Comb | |
| 2017/0239892 A1* | 8/2017 | Buller | B29C 67/0088 |

OTHER PUBLICATIONS http://www.cognex.com/products/machine-vision/ds-1000-displacement-sensor-laser-profiler/. Accessed on May 10, 2016.

http://lmi3d.com/. Accessed on May 10, 2016.

http://www.photonfocus.com/products/?no_cache=1&cid=2. Accessed on May 10, 2016.

https://en.ids-imaging.com/ensenso-stereo-3d-camera.html. Accessed on May 10, 2016.

http://www.vrmagic.com/imaging/3d-sensors/. Accessed on May 10, 2016.

http://www.vision-components.com/fileadmin/user_upload/DE/flyer/20160324_28337nl_VCnano3D_DE-EN_web.pdf. Accessed on May 10, 2016.

http://www.chromasens.de/en/3d-line-scan-camera-3dpixa#. Accessed on May 10, 2016.

* cited by examiner

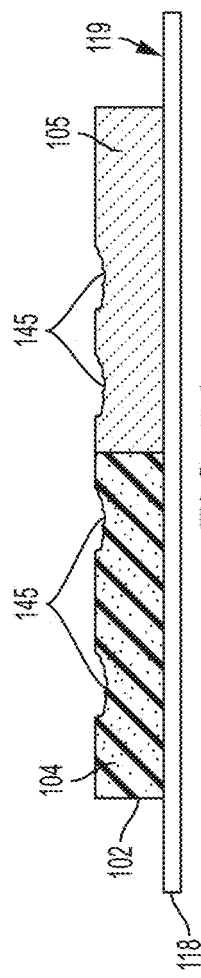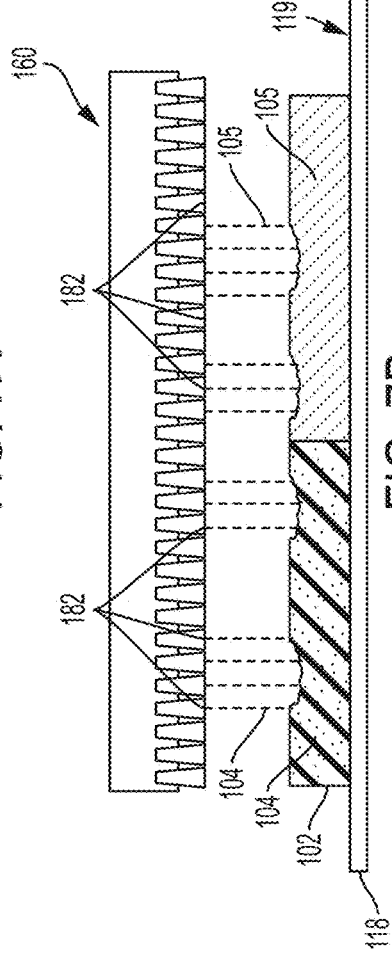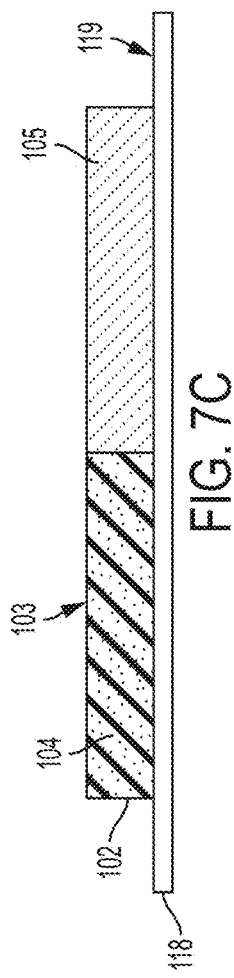

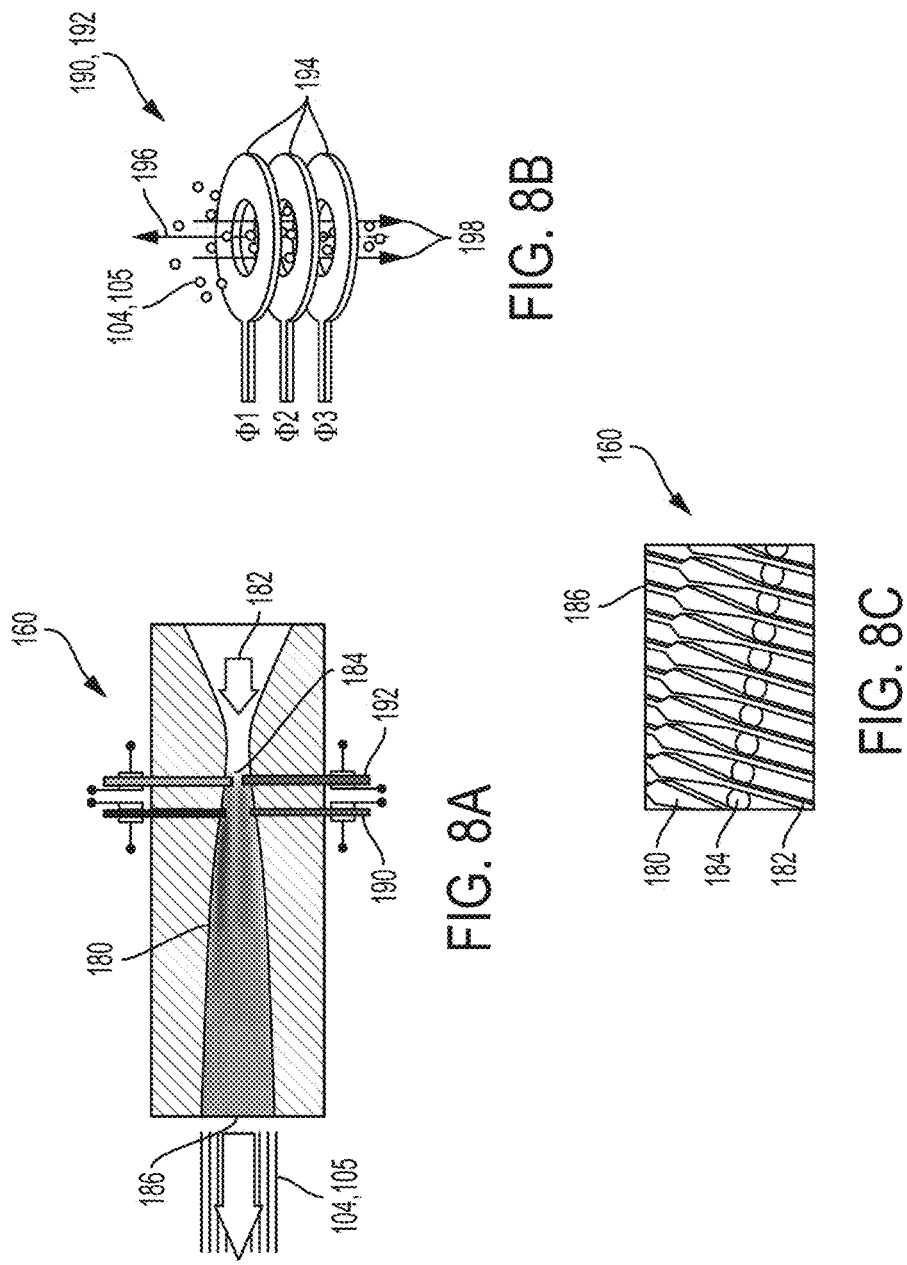

ELECTROSTATIC 3-D PRINTER CONTROLLING LAYER TOPOGRAPHY USING AEROSOL APPLICATOR

BACKGROUND

Systems and methods herein generally relate to three-dimensional printing processes that use electrostatic printing processes.

Three-dimensional printing can produce objects using, for example, ink-jet printers. In many systems, a platform moves relative to an ink-jet to form a layer of build and support materials, and each layer is hardened using a UV light source. These steps are repeated layer-by-layer. Support materials generally comprise acid-, base- or water-soluble polymers, which can be selectively rinsed from the build material after 3-D printing is complete.

The electrostatic (electro-photographic) process is a well-known means of generating two-dimensional digital images, which transfer materials onto an intermediate surface (such as a photoreceptor belt or drum). Advancements in the way an electro-photographic image is transferred can leverage the speed, efficiency and digital nature of printing systems.

SUMMARY

Exemplary three-dimensional (3-D) printers include, among other components, an intermediate transfer surface, such as an intermediate transfer belt (ITB), build and support material development stations positioned to electrostatically transfer layers of build and support material to the ITB, and a transfuse station adjacent the ITB. A platen having a flat surface is positioned to repeatedly contact the ITB. The platen moves relative to the ITB, and the ITB transfers a layer of the build material and the support material to the flat surface of the platen each time the platen contacts one of the layers on the ITB at the transfuse station to successively form a freestanding stack of the layers on the flat surface of the platen.

Also, an optional fusing station can be positioned to apply heat and pressure to the freestanding stack to fuse the layers together on the platen, and an optional curing station can also be positioned to apply heat and ultraviolet light to the freestanding stack to crosslink polymers in the build material. A sensor is positioned to generate a topographic measurement of the layer on the platen after the fusing station fuses the layer. Further, an aerosol applicator is positioned to propel build and support material on to the post-fused layer (after the layer is fused by the fusing station). A feedback loop (that potentially includes a processor) electrically connects the aerosol applicator to the sensor. The sensor detects the depressions in the post-fused layer, and supplies depths and locations of the depressions to the aerosol applicator through the feedback loop.

The aerosol applicator controls the amount and location of build and support material being propelled, based on the topographic measurement of the layer from the sensor through the feedback loop, to adjust the amount and location of the build and support material propelled on to the post-fused layer to control the flatness of surface topology of the layers in the freestanding stack on the platen. Thus, the aerosol applicator selectively propels different amounts of build and support material to different locations of each post-fused layer to fill in depressions of the surface topology of the layers to make the surface topology of all layers flat, and parallel to the flat surface of the platen.

The aerosol applicator is a gas jet having a venturi narrowed tubular jet body driven by pressurized gas. In one example, the aerosol applicator is an array of gas jets that can selectively propel both build and support material. In some structures, each gas jet includes electrical field gates that control whether build material or support material is propelled, as well as the amount of the build material and/or the support material propelled out of the aerosol applicator. In other structures, some of the gas jets only propel build material while all the other gas jets only propel support material, and the array configuration includes alternating build material gas jets and support material gas jets.

These and other features are described in, or are apparent from, the following detailed description.

BRIEF DESCRIPTION OF THE DRAWINGS

Various exemplary systems and methods are described in detail below, with reference to the attached drawing figures, in which:

FIGS. 7A-8C are expanded schematic diagrams illustrating devices herein;

DETAILED DESCRIPTION

Figure 1:
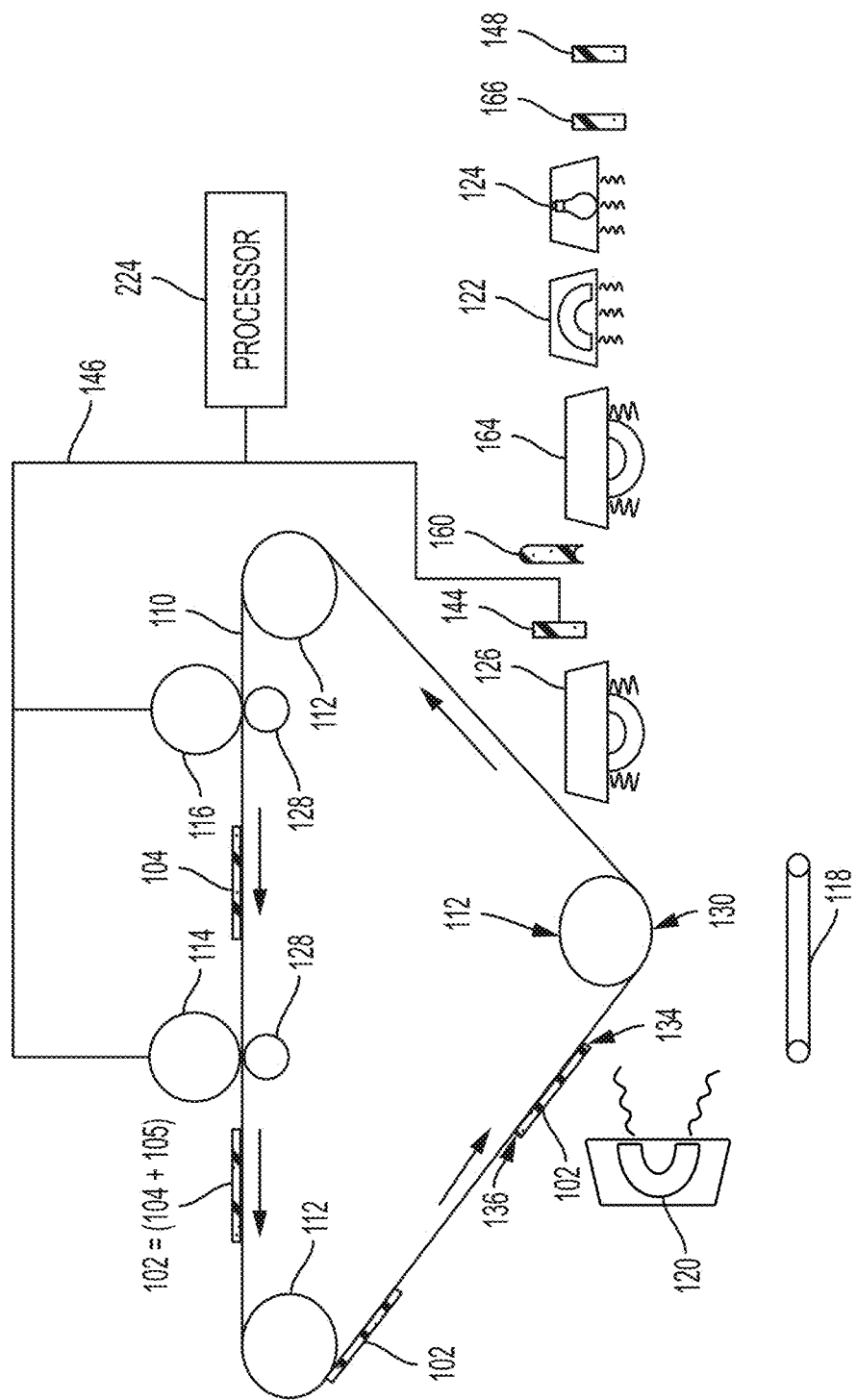
FIG. 1-6 are schematic cross-section diagrams partially illustrating devices herein.

With 3-D printing technologies, the thickness uniformity and surface characteristics of each layer should be controlled to achieve a well-formed, accurate final 3-D part. Once the layers are placed on top of each other, any non-uniformity in the thickness or topography of the individual layers, or mis-registration between the part and support material creates a malformed and/or objectionable final part, due to the cumulative nature of the non-uniformities. Thus, the devices discussed below provide a leveling process for each layer to ensure part robustness.

As is understood by those skilled in the art, after the part and support material are developed and transferred to a belt using an electrostatic process, the layer is transfused to previous layers at a transfuse assembly. The topography of the transfused layers can vary due to the pressure and heat that is applied in the transfuse step due to the part holding more heat as the part gets thicker. In addition to the average topography variation between layers, the within layer topography can also vary due to environmental instability, development roll run out, drum wear, etc.

To combat the variation in layer topography, devices and methods herein make a topography measurement of each layer after it has transfused to the part. This feedback can help reduce the effects of changing heat capacity as the final part gets thicker or topography variation due to cross process and process direction non-uniformity within each individual layer.

Thus, the devices and methods herein improve the overall accuracy and uniformity of a 3-D printed part by monitoring each individual layer topography and using that topography data as feedback to actuate an aerosol applicator (e.g., a ballistic aerosol marking (BAM) print head module) to add build and/or support material to the already fused surface, which is measured in-situ to have a non-uniform surface topology and needs to be made smooth so dimensional inaccuracies are reduced or eliminated prior to additional levels being added. The non-uniformity measurement information is fed back to the aerosol applicator and then additional material, both build and support, is digitally added to the post-fused part, where needed, in order to smooth or make the top layer more uniform and ready for the next and subsequent layers.

Thus, the aerosol applicator adds support and build materials to lower regions measured on the layer to level the freshly transfused layer. Depending upon the build and support material selected, the high velocity at which the aerosol applicator projects material acts to fuse the projected build and support material to the existing layer. When other build and support materials, other structures herein include an additional fusing station adjacent the aerosol applicator that fuses the projected build and support materials to the existing layer. After the aerosol applicator projects the additional build and support materials to form a flat surface (and after a potential second fusing process), the platen returns back to the transfuse nip, where it is preheated in preparation for the next layer to be transfused.

As shown, for example, in FIG. 1, 3-D printers herein include, among other components, an intermediate transfer surface 110 (which can be a surface, drum or belt, and is sometimes referred to herein as an intermediate transfer belt (ITB)) supported on rollers 112, a first printing component (e.g., development station 116), a second printing component (e.g., development station 114), and a platen 118 (which can be a platform surface or belt) adjacent the ITB 110. A pattern of build and support material is transferred from the development stations 114, 116 to the intermediate transfer belt 110, and from the intermediate transfer belt to the platen 118. Also, such structures can include transfuse heaters 120, optional separate fusing station 126 (which can be incorporated into the transfuse nip 130), an optional separate post-aerosol fusing station 164, and an optional curing station that is positioned to apply light (e.g. UV light) using a light source 124 and/or heat using a heater 122. The structure can also optionally include a cooling station 166, and a support material removal station 148.

FIG. 1 illustrates that a sensor 144 is positioned to generate a topographic measurement of the layer on the platen 118 after the transfuse nip 130 transfuses the layer to the platen 118 (and possibly after the optional additional fusing station 126 fuses the layer). Further, an aerosol applicator 160 is positioned to propel build and support material on to the post-fused layer (after the layer 102 is transfused by the transfuse nip 130 and possibly fused by the fusing station 126). A feedback loop 146 (that potentially includes a processor 224) electrically connects the aerosol applicator 160 to the sensor 144. The sensor 144 detects the depressions in the post-fused layer, and supplies depths and locations of the depressions in a topological measurement to the aerosol applicator 160 through the feedback loop 146.

As shown in FIG. 1, the first printing component 116 is positioned to electrostatically transfer (by way of charge difference between the belt and the material being transferred) a first material 104 (e.g., the build material, such as a (potentially dry) powder polymer-wax material (e.g., charged 3-D toner)) to the ITB 110, and a second printing component 114 (which can also be, for example, a photoreceptor) is positioned to also electrostatically transfer a second material 105 (e.g., the support material, again such as a powder polymer-wax material (e.g., charged 3-D toner)) to a location of the ITB 110 where the first material 104 is located on the ITB 110.

The support material 105 dissolves in solvents that do not affect the build material 104 to allow the printed 3-D structure 104 to be separated from the support material 105 used in the printing process. In the drawings, the combination of the build material 104 and the support material 105 is shown as element 102, and is referred to as a developed layer. The developed layer 102 of the build material 104 and the support material 105 is on a discrete area of the ITB 110 and is in a pattern corresponding to the components of the 3-D structure in that layer (and its associated support elements), where the 3-D structure is being built, and developed layer 102 by developed layer 102.

Figure 2:
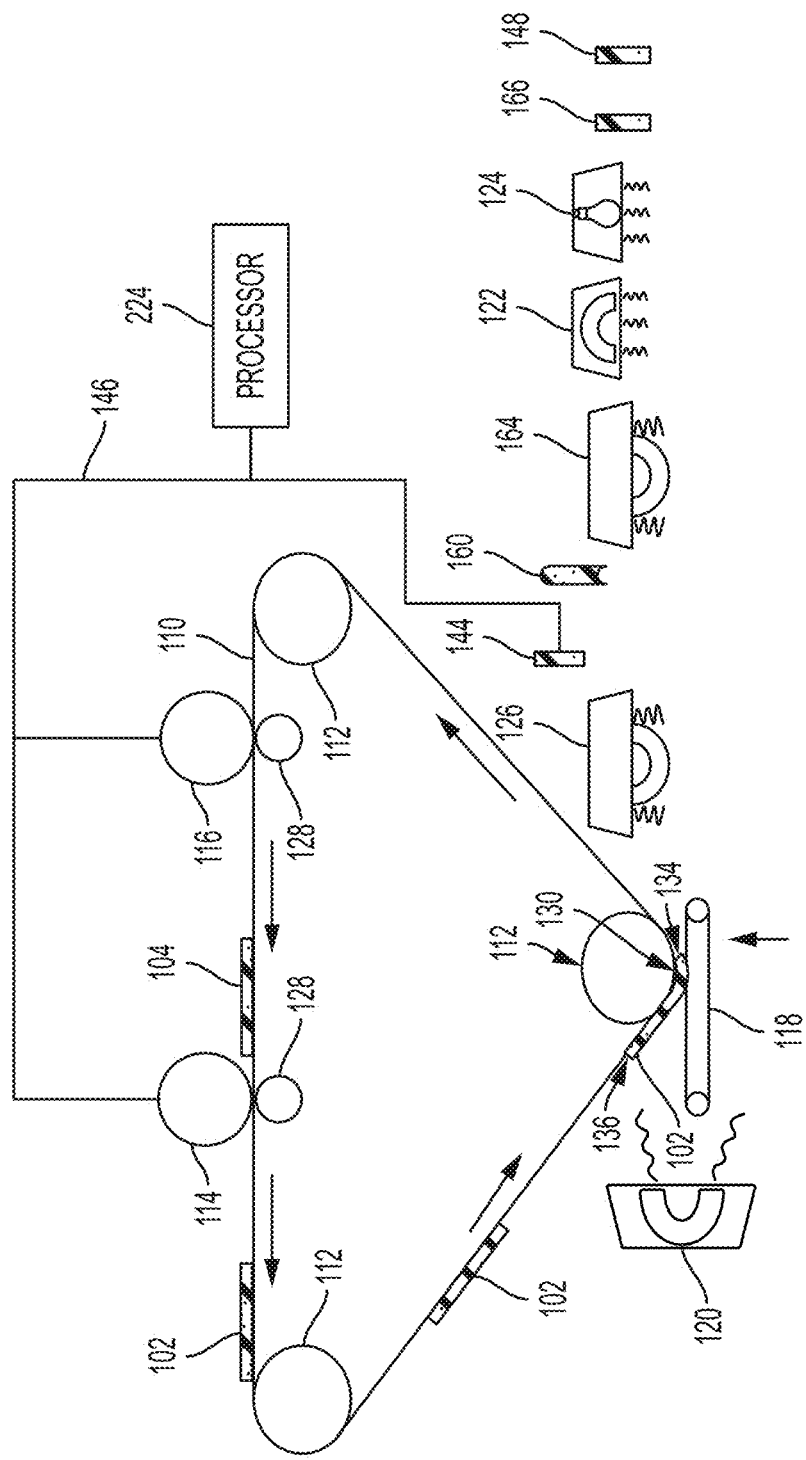

As shown by the vertical arrow in FIG. 2, the platen 118 moves (using motors, gears, pulleys, cables, guides, etc. (all generally illustrated by item 118)) toward the ITB 110 to have the platen 118 make contact with the ITB 110. The developed layer 102 can be electrostatically transferred to the ITB 110, and/or the developed layer 102 and ITB 110 can be locally heated by heater 120 to bring the developed layer 102 to a "tacky" state prior to transfuse (i.e., to a temperature higher than the glass transition temperature (Tg) but short of the melt or fuse temperature Tm of the toner resin). The platen 118 can also be heated by heater 120 to approximately the same temperature, and is then contacted synchronously with the tacky layer 102 as it translates through the ITB-platen nip (the transfuse nip 130). The ITB 110 transfers one of the developed layer 102 of the build material 104 and the support material 105 to the platen 118 each time the platen 118 contacts the ITB 110 (based on electrostatic forces and/or the tacky nature of the materials) to successively form developed layers 102 of the build material 104 and the support material 105 on the platen 118.

Such build and support materials are printed in a pattern on the ITB by each separate development stations 114, 116, and combine together in the developed layers 102 to represent a specific pattern having a predetermined length. Thus, each of the developed layers 102 has a leading edge 134 oriented toward the processing direction in which the ITB 110 is moving (represented by arrows next to the ITB 110) and a trailing edge 136 opposite the leading edge 134.

More specifically, as shown in FIG. 2, at the transfuse nip 130, the leading edge 134 of the developed layer 102 within the transfuse nip 130 begins to be transferred to a corresponding location of the platen 118. Thus, in FIG. 2, the platen 118 moves to contact the developed layer 102 on the ITB 110 at a location where the leading edge 134 of the developed layer 102 is at the lowest location of the roller of the transfuse nip 130. Thus, in this example, the trailing edge 136 of the developed layer 102 has not yet reached the transfuse nip 130 and has not, therefore, yet been transferred to the platen 118.

Figure 3:
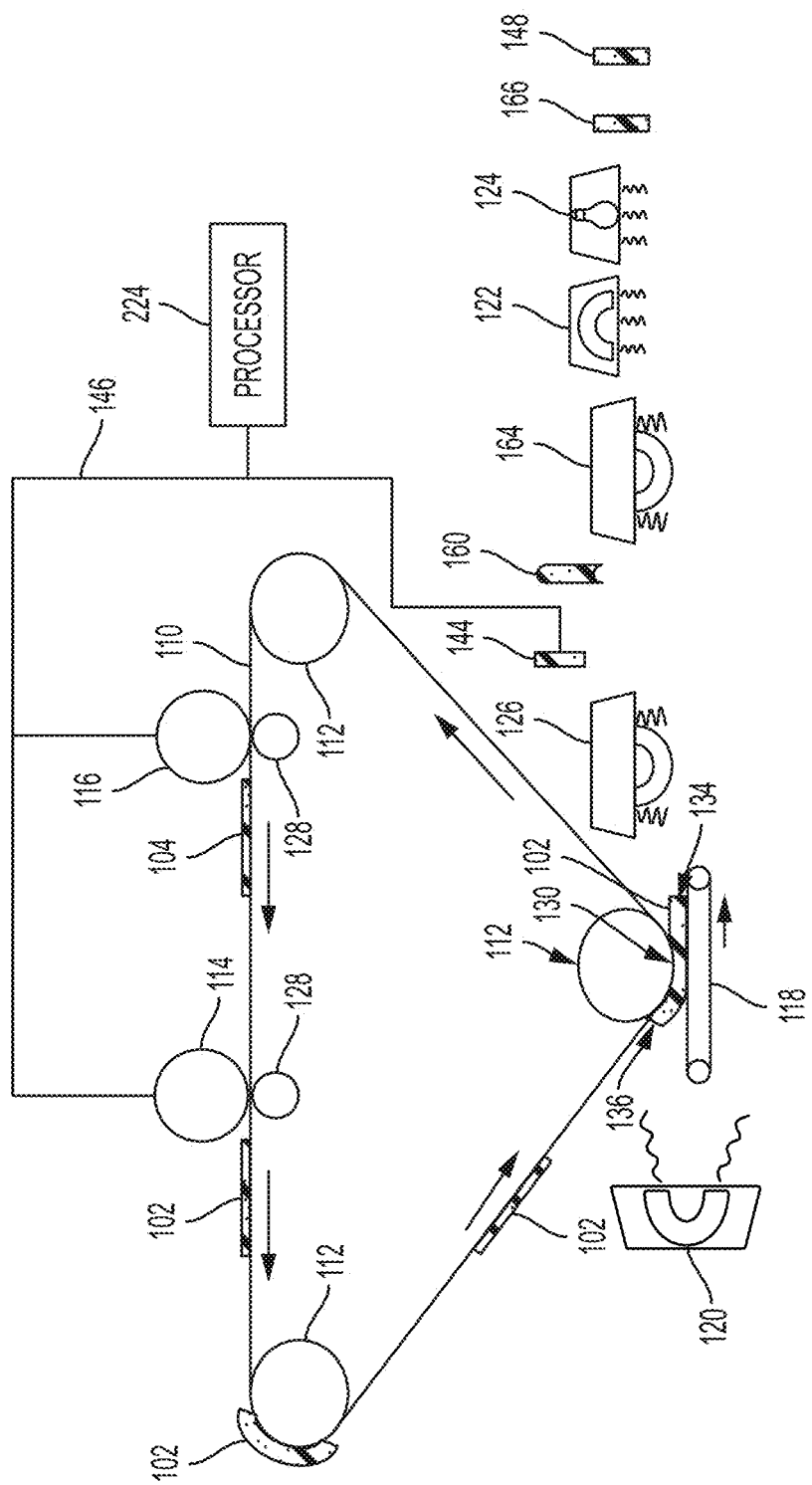

As shown in FIG. 3, the platen 118 moves synchronously with the ITB 110 (moves at the same speed and the same direction as the ITB 110) either by moving or rotating the platen vacuum belt, to allow the developed layers 102 to transfer cleanly to the platen 118, without smearing. In FIG. 3, the trailing edge 136 of the developed layer 102 is the only portion that has not yet reached the transfuse nip 130 and has not, therefore, been transferred to the platen 118 or a freestanding stack of developed layers 106.

Figure 4:
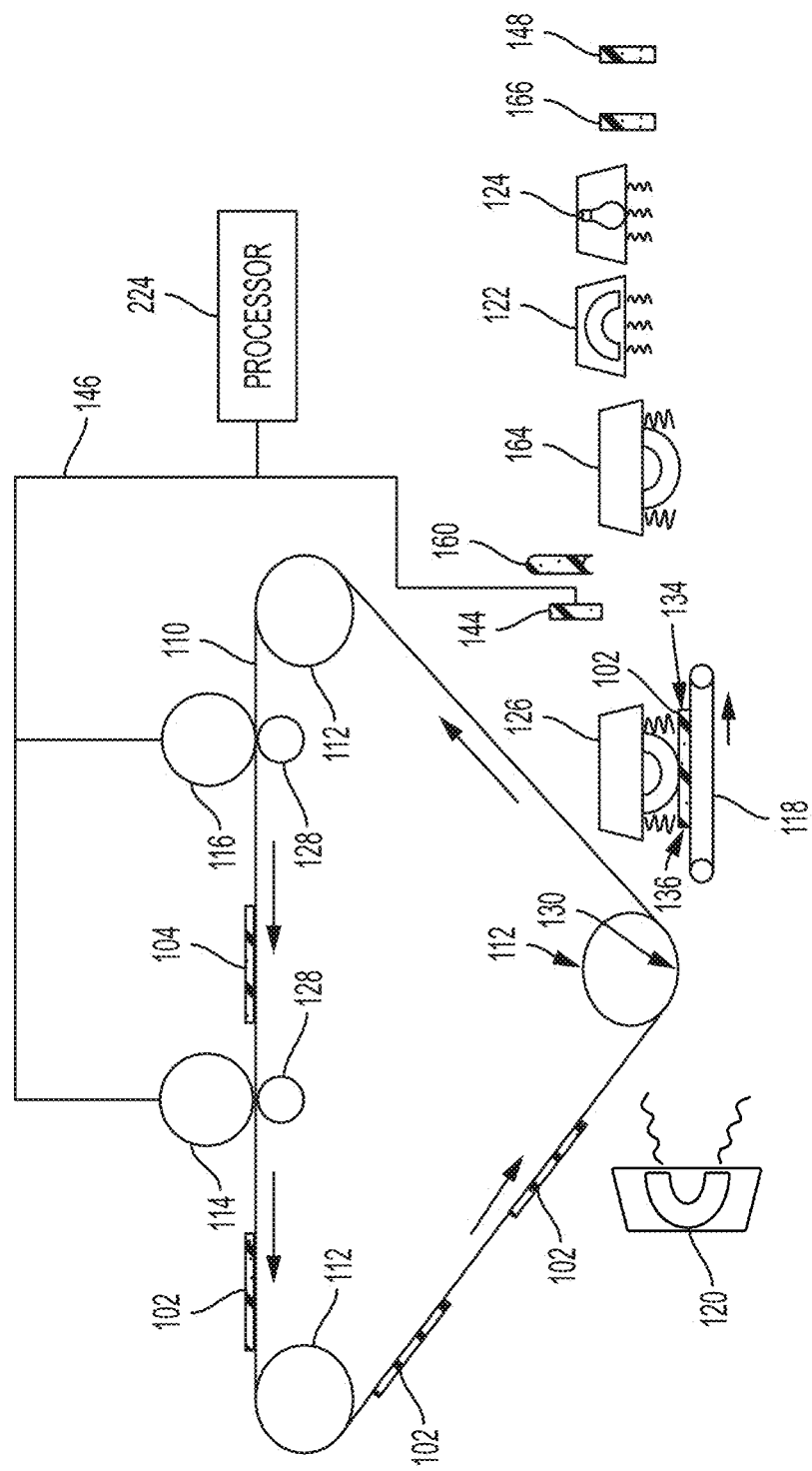

Then, as the ITB 110 moves in the processing direction, the platen 118 moves at the same speed and in the same direction as the ITB 110, until the trailing edge 136 of the developed layer 102 reaches the bottom of the roller of the transfuse nip 130, at which point the platen 118 moves away from the ITB 110 and over to the optional separate fusing station 126, as shown in FIG. 4 (again, the fusing station 126 can be omitted and can be incorporated into the transfuse nip 130). The heater of the fusing station 126 can be a non-contact (e.g., infrared (IR)) heater, or a pressure heater, such as a fuser roller. If the fusing station 126 is a pressure roller, the platen 118 moves synchronously as the roller rotates, heating and pressing to fuse the developed layer 102 to the platen 118. These synchronous movements between the platen 118 and the ITB 110 (and heater roller 126) causes the pattern of support and build materials (102) that is printed by the development stations 116, 114 to be transferred precisely from the ITB 110 to the platen 118, without distortion or smearing.

Figure 5:
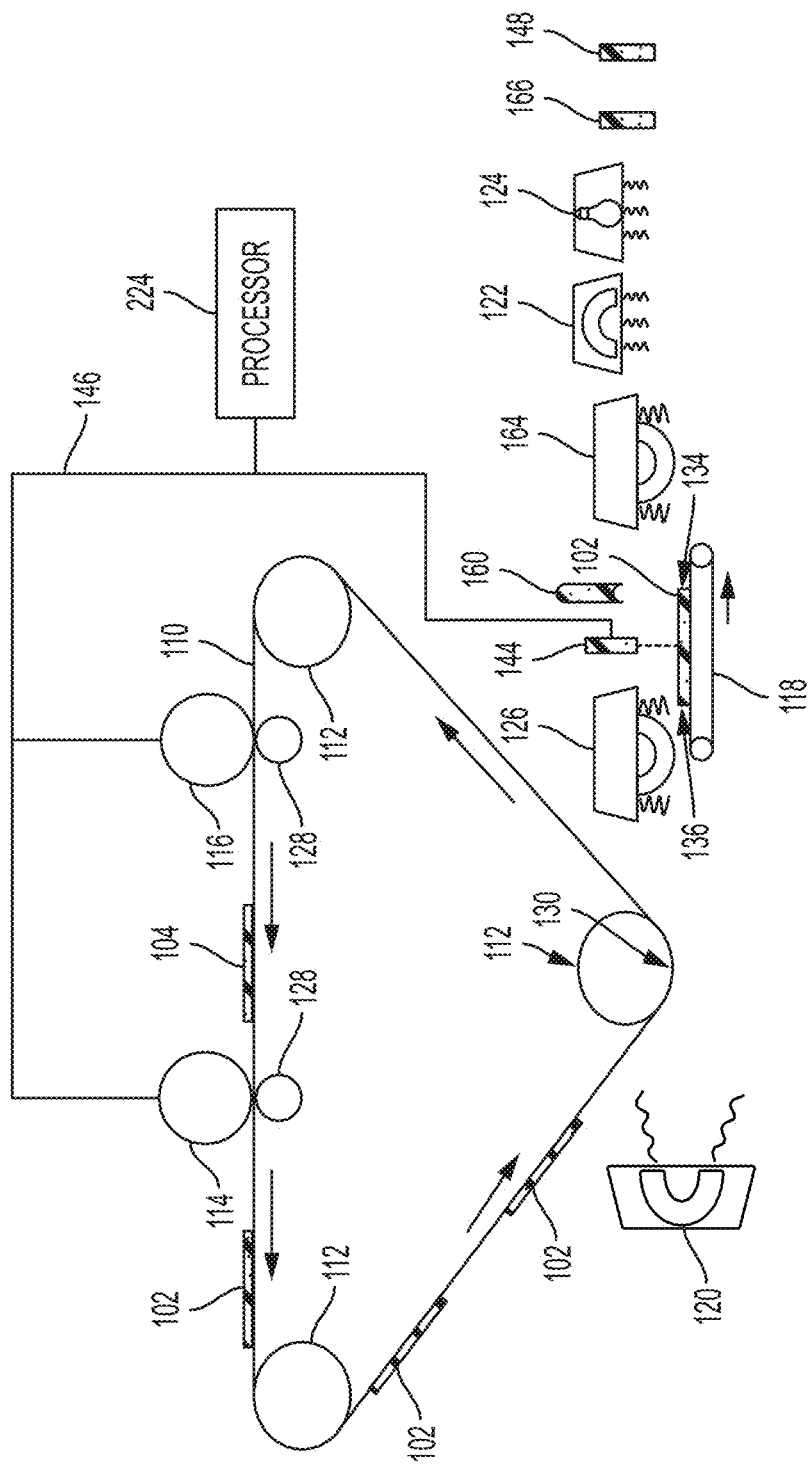

As shown in FIG. 5, the sensor 144 is positioned to detect the topography of the layer 102 on the platen 118 after the fusing station 126 fuses the layer 102 (or immediately after the transfuse station 130 transfuses the layer 102 to the platen 118, if the separate fusing station 126 is omitted). Again, the feedback loop 146 is electrically connected to the sensor 144 and the aerosol applicator 160. The sensor 144 can be any form of topography measurement device including contact and non-contact devices, and is calibrated to only detect the thickness and/or topography of the very top layer on the platen 118.

For example, the sensor 144 can include a laser and camera, and use laser profiling (laser triangulation), where object profiles are measured using a laser sheet-of-light (triangulation) technique. With laser profiling sensors 144, a laser line is projected on the object, and the resulting sensor image is evaluated by a camera core and converted into a single height profile by scanning the laser line over the object. Thus, a complete height and topographic image of the object can be acquired. The sensor 144 is capable of delivering position data as well as additional features (e.g., intensity, line width) without sacrificing profile speed.

In another example, the sensor 144 can use time-of-flight topography measurement, which creates distance data using the principle where the entire "scene" is captured with each laser or light pulse (again, using a laser source and camera). Here, a 3-D camera system covers distances from a few meters up to several meters, depending on the detector material being used. At the heart of the camera is an advanced sensor technology employing the time-of-flight distance measurement principle where infrared light from the camera's internal lighting source is reflected by objects in the scene and travels back to the camera where its precise time of arrival is measured independently by each of tens of thousands of sensor pixels.

Also, the sensor 144 can be a light sensor that uses structured light, where a light source projects a narrow band of light onto a three-dimensionally shaped surface to produce a line of illumination that appears distorted from other perspectives than that of the projector, and can be used for an exact geometric reconstruction of the surface shape (light section). The structured light sensor 144 can also provide a faster and more versatile process by projecting patterns consisting of many stripes at once, or of arbitrary fringes, as this allows for the acquisition of a multitude of samples simultaneously. Seen from different viewpoints, the pattern appears geometrically distorted due to the surface shape of the object.

Further, the sensor 144 can be a stereoscopic (stereo vision) system that uses two cameras displaced horizontally from one another. Together, these cameras obtain two different views of a scene from which a 3-D image can be reconstructed.

In another alternative, the sensor 144 can be a contact-based gelsight sensing device that has a slab of clear elastomer covered with a reflective skin. When an object presses on the reflective skin, the reflective skin distorts to take on the shape of the object's surface. When viewed from behind (through the elastomer slab), the reflective skin appears as a relief replica of the surface. A camera is included in the sensor 144 to record an image of this relief, using illumination from red, green, and blue light sources at three different positions. A photometric stereo algorithm that is tailored to the device is then used to reconstruct the surface.

Figure 6:
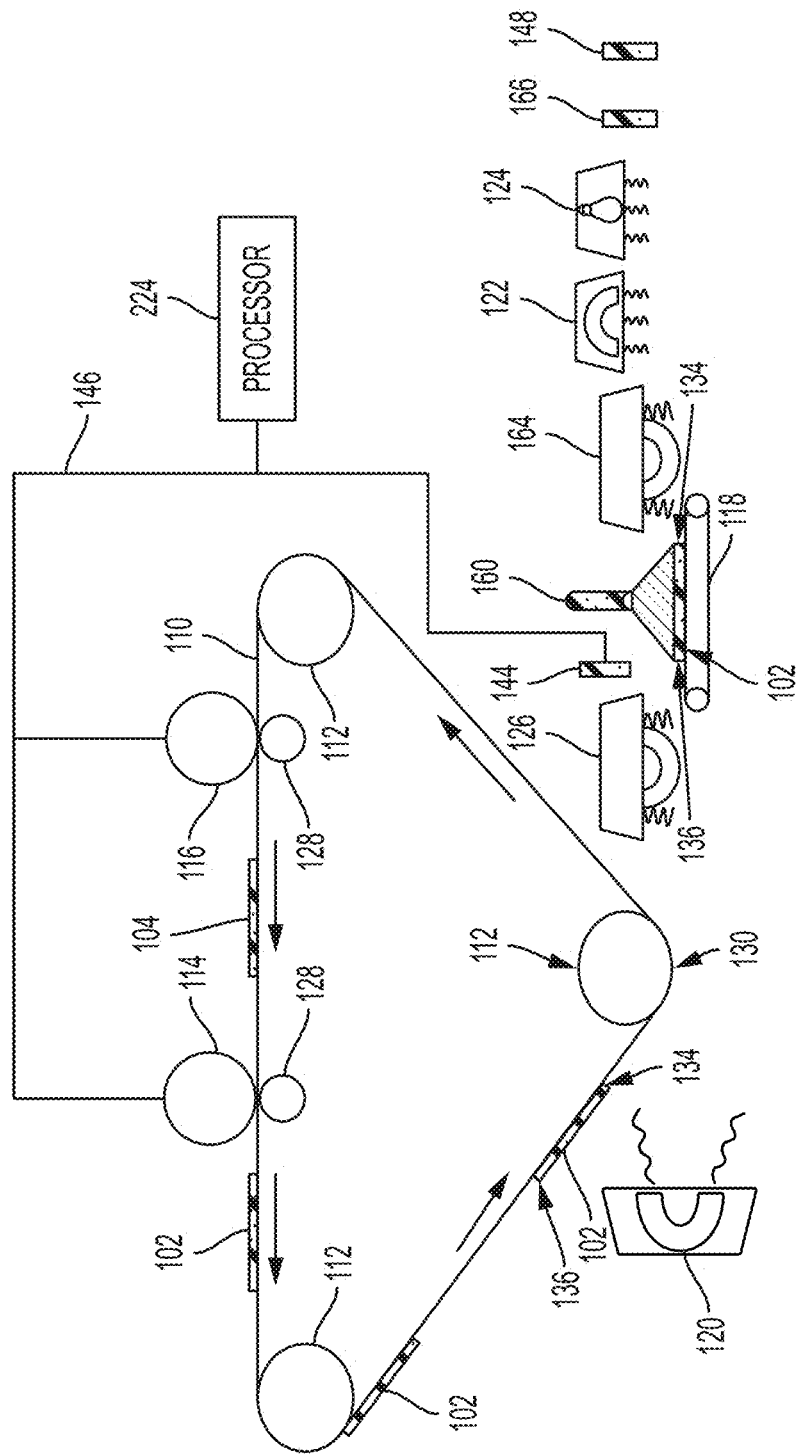

As shown in FIG. 6, the aerosol applicator 160 is positioned to propel build and support material on to the post-fused layer 102 (after the layer 102 is fused by the fusing station 126 or simply by the transfuse nip 130). As shown, the feedback loop 146 (that potentially includes a processor 224) electrically connects the aerosol applicator 160 to the sensor 144. The sensor 144 detects the depressions in the post-fused layer 102, and supplies depths and locations of the depressions in a topological measurement to the aerosol applicator 160 through the feedback loop 146. The aerosol applicator 160 controls the amount and location of build and support material being propelled, based on the topographic measurement of the layer 102 from the sensor 144 through the feedback loop 146, to adjust the amount and location of the build and support material propelled on to the post-fused layer 102 to control the flatness of surface topology of the layers 102 in the freestanding stack 106 on the platen 118.

For example, as shown in FIG. 7A, which illustrates a portion of one of the layers 102 that includes some of the build material 104 and some of the support material 105, topographical surface regularities (such as depressions 145) can be present within the layer 102 because of various printing/transfuse irregularities. In order to flatten the surface topology of the layer 102, as shown in FIG. 7B, the aerosol applicator 160 selectively propels different amounts of build material 104 and support material 105 to different locations 145 of each post-fused layer 102 from an array of nozzles 182 to fill in the depressions 145. Such processing makes the surface topology of the top 103 of all layers 102 flat, and parallel to the flat surface 119 of the platen 118, as shown in FIG. 7C.

In greater detail, FIG. 8A illustrates that the aerosol applicator 160 is at least one gas jet having a venturi 184 narrowed tubular jet body 180 driven by pressurized gas supplied to an inlet 182. The venturi 184 selectively draws particles of build material 104 and support material 105 from supply containers through the action of the high-speed gas passing through the narrowed section 184 of the tubular jet body 180. The pressure of the gas (e.g., $CO_2$, $N_2$, etc.) supplied to the inlet is high pressure (e.g., above 1 Atm, 10 Atm, 50 Atm, 100 Atm, etc.) and causes particles of build material 104 and support material 105 to be propelled at very high speed from the nozzle 186 (e.g., 2 m/s, 10 m/s, 25 m/s, 75 m/s, 100 m/s, etc.).

The electrical field gates 190, 192 shown in FIGS. 8A and 8B create magnetic fields that control whether particles of build material 104 and support material 105 pass into the flow of high-speed gas passing through the venturi 184. Specifically, one of the electrical field gates 190 controls whether build material 104 passes into the flow of high-speed gas; and the other electrical field gate 192 controls whether the support material 105 passes into the flow of high-speed gas, potentially from the same nozzle 186.

In the example shown in FIG. 8B, voltage pulses are applied to different electrodes of a three-phase traveling wave grid 194 which controls whether particles of build or support material 104, 105 are allowed to pass into the flow of gas (illustrated by arrow 196) or whether such particles of build or support material 104, 105 will be directed in an opposite direction (illustrated by arrow 198). Such electrical field gates 190, 192 control whether build material 104 or support material 105 is propelled, as well as the amount of the build material 104 and/or the support material 105 propelled out of the nozzle 186 of the aerosol applicator 160.

In the example shown in FIG. 8C, the aerosol applicator 160 is an array of gas jets 180 each of which includes an inlet 182, a venturi 184, and a nozzle 186. Each of the gas jets 180 in the array can selectively propel both build and support material (but not both at the same time) as controlled by the electrical field gates 190, 192. In other structures, some of the gas jets 180 only propel build material 104, while all the other gas jets only propel support material 105, and such an array configuration includes alternating build material gas jets and support material gas jets.

Figure 9:
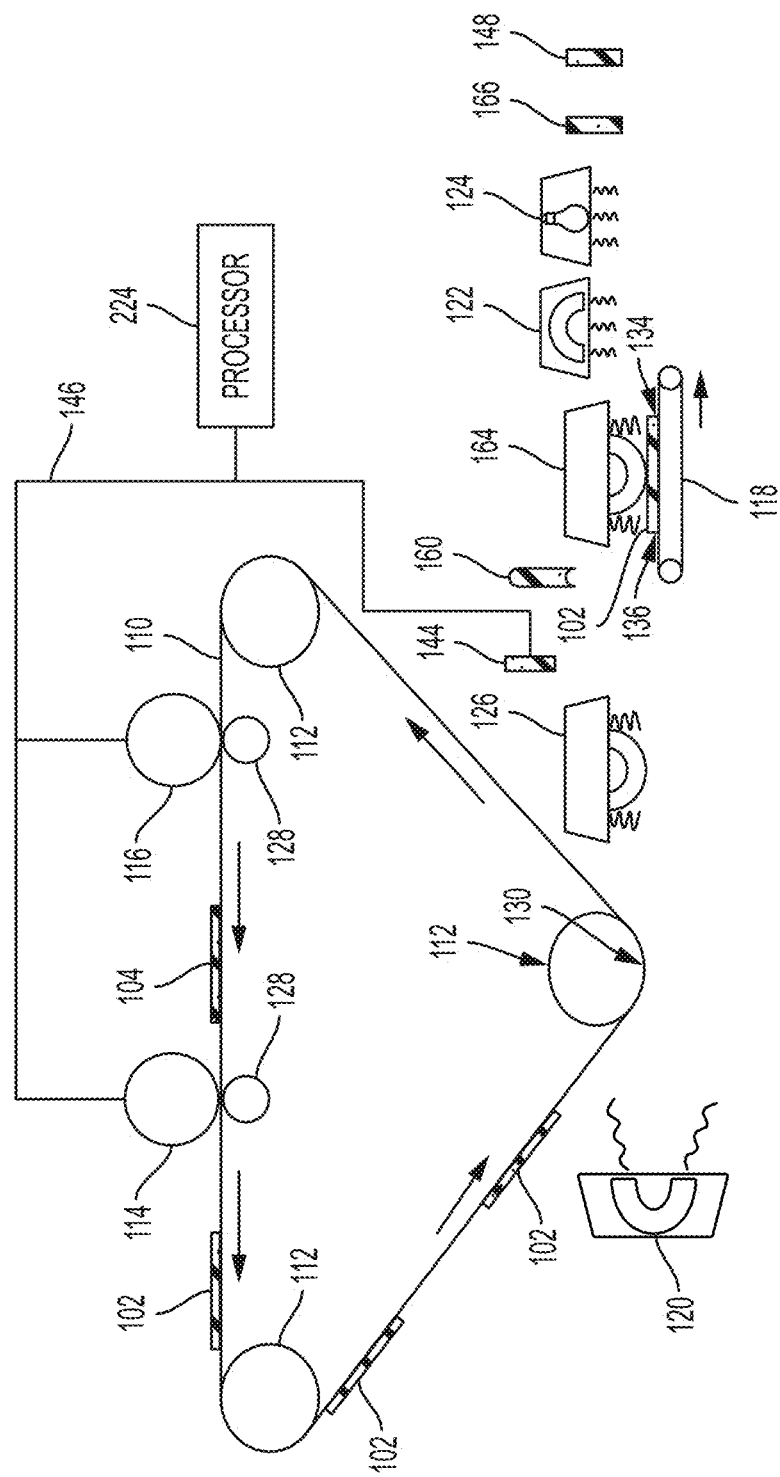
FIGS. 9-13 are schematic cross-section diagrams partially illustrating devices herein.

At this point the platen 118 can move to an optional additional fusing station 164 (FIG. 9) to fuse the propelled build and support material to the existing build and support material of the layer 102.

Figure 10:
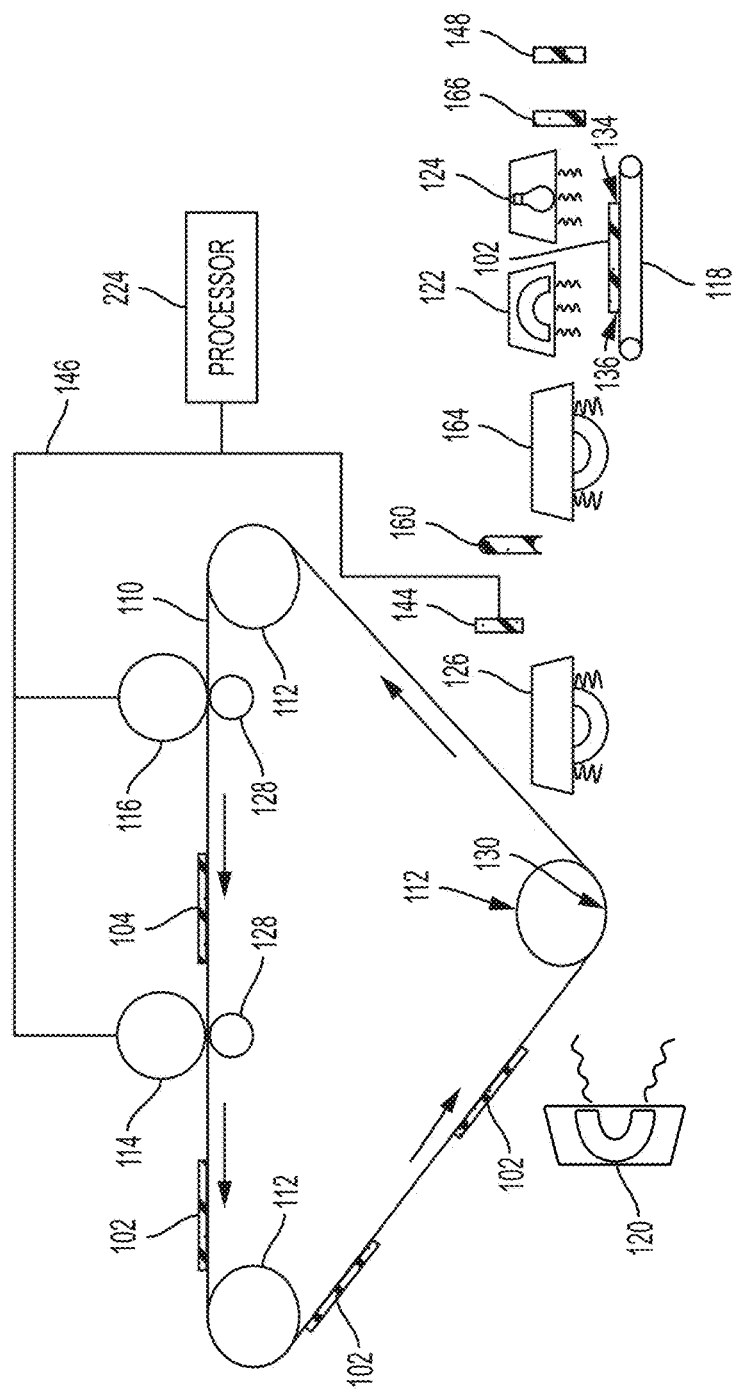

As shown in FIG. 10, the optional curing station 122, 124 is configured and positioned to apply light and/or heat to the 3-D structure to bond the developed layers 102 in the freestanding stack 106 to one another on the platen 118 (e.g., by crosslinking polymers in the stack 106). The selective use of heaters, lights, and other components 122, 124 of the curing station will vary depending upon the chemical makeup of the developed layers 102.

In one example, the build material 104 can include UV curable toners. Curing station 122, 124 bonds such materials by heating the materials to a temperature between their glass transition temperature and their melting temperature, and then applies UV light to cross-link the polymers within the materials, thereby creating a rigid structure. Those ordinarily skilled in the art would understand that other build and support materials would utilize other bonding processing and bonding components, and that the foregoing is presented only as one limited example; and the devices and methods herein are applicable to all such bonding methods and components, whether currently known or developed in the future.

Figure 11:
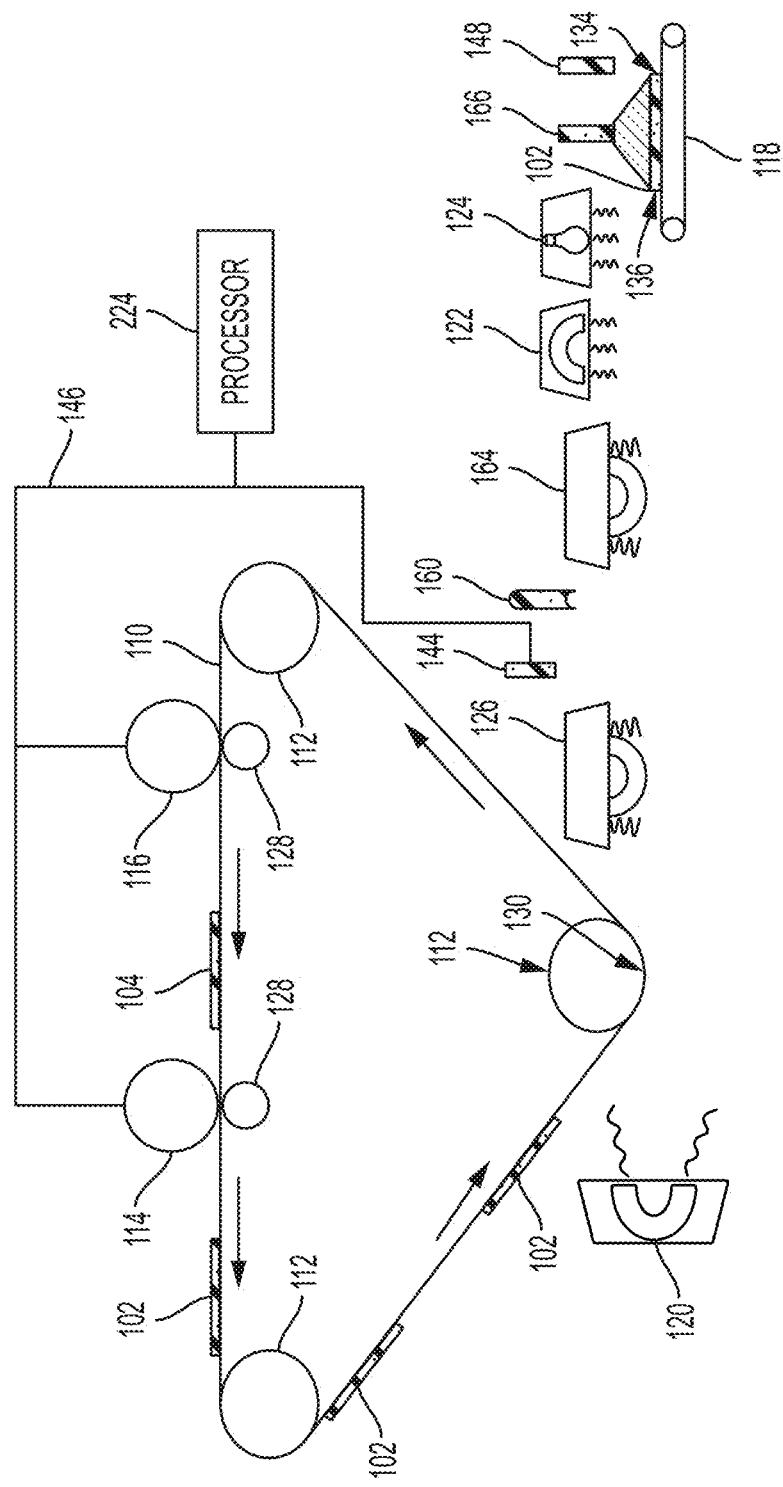

Additionally, the platen 118 can move to an optional cooling station 166 (FIG. 11) that supplies cool air (e.g., using a fan and ductwork) that cools the layer 102 before an additional layer is transfused. Alternatively, a cooling pause in processing can be used to cool the layers 102 on the platen 118 between layer 102 transfers.

Figure 12:
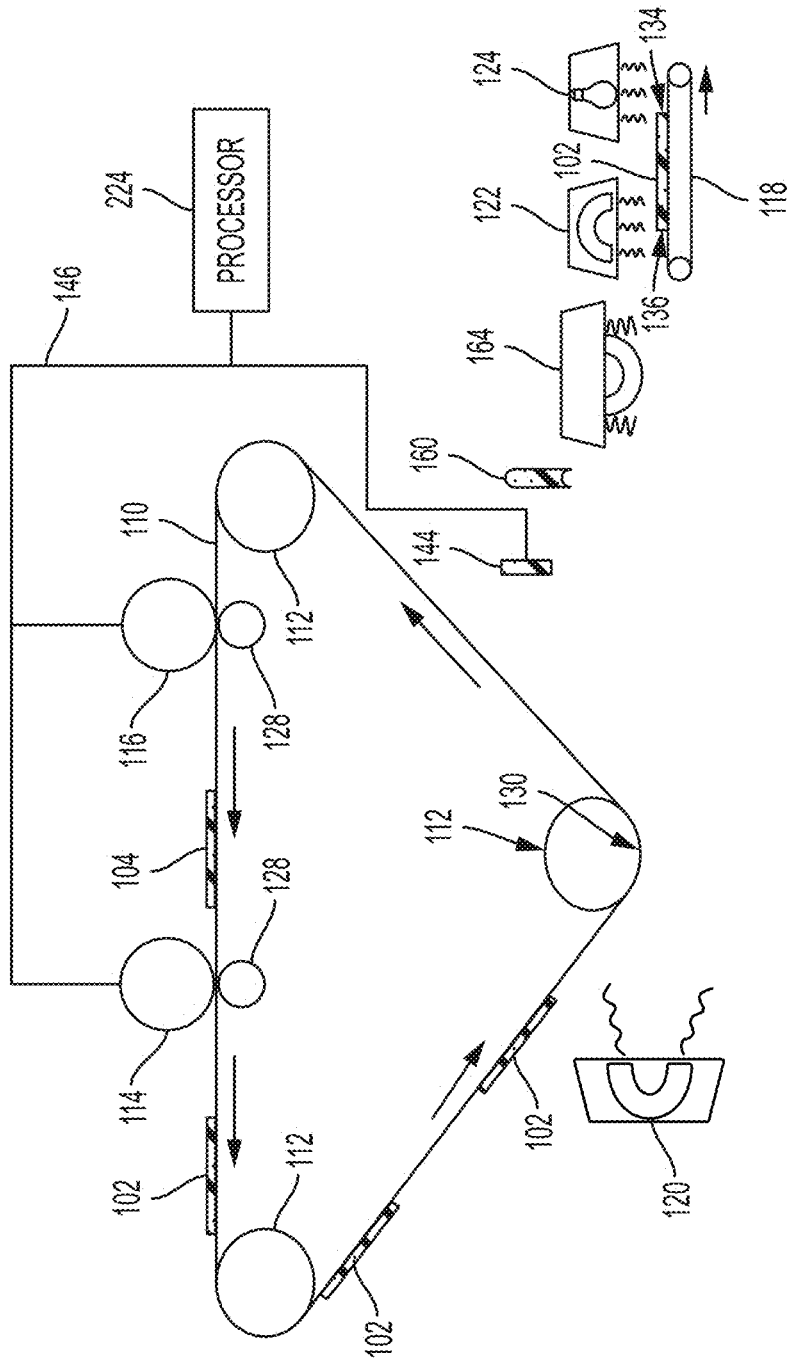

While some of the various components have been shown in specific locations in the above-described drawings, many of the foregoing components are optional and can be eliminated, or repositioned. Therefore, in other alternative structures, the fusing station 126, cooling station 166, and support material removal station 148 (discussed below) can be eliminated, and the curing station 122, 124 can cure the build and support material after the fusing station 164 fuses the layer 102, as shown in FIG. 12.

Figure 13:
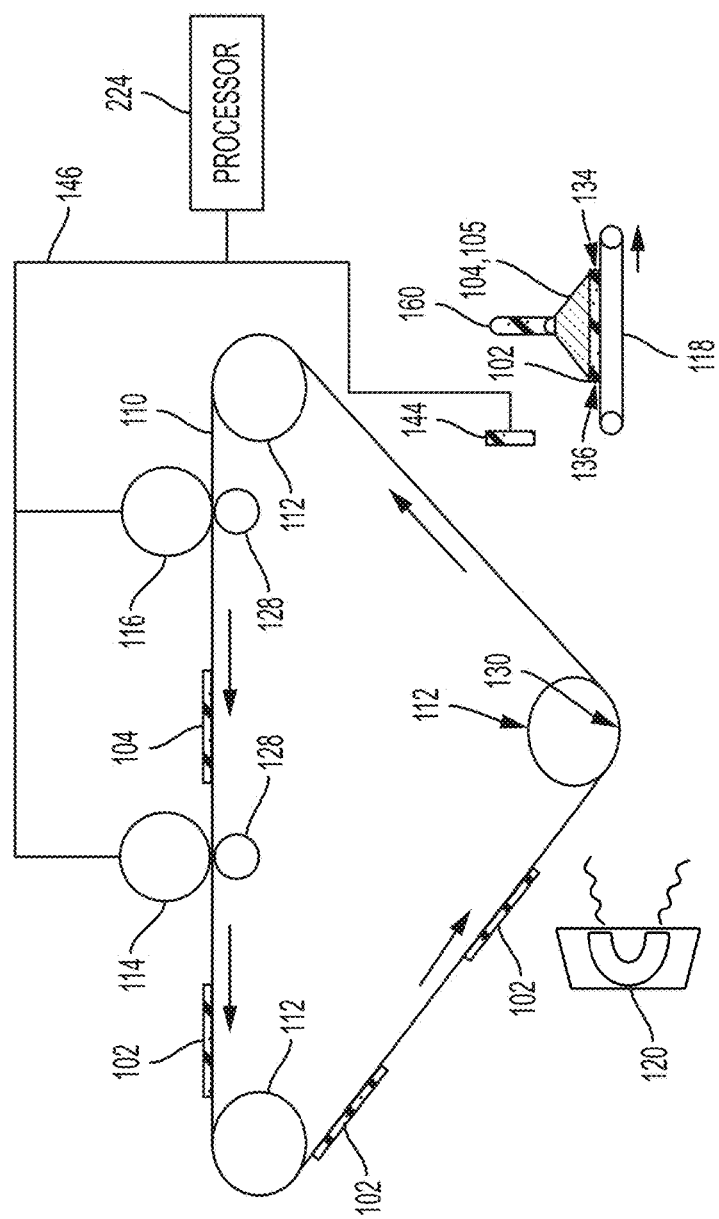

In other structures, as shown in FIG. 13, the additional fusing stations 126 and 164, curing station 122, 124, cooling station 166, and support material removal station 148 (discussed below) can be eliminated. With the structure shown in FIG. 13, the transfuse nip 130 performs all the fusing action required, and the speed at which the aerosol applicator 160 propels the build and support material generates heat when the particles hit the layer 102, and such heat alone fuses such material to the existing layer 102, without requiring an additional fusing station. In addition, in FIG. 13, the build and support material are selected so as not to require UV curing, which allows the curing station 122, 124 to also be eliminated from the structure. While some arrangements and alternative structures are shown above, those ordinarily skilled in the art would understand that many other arrangements and structures are available and are intended to be included within the claims presented below.

Figure 14:
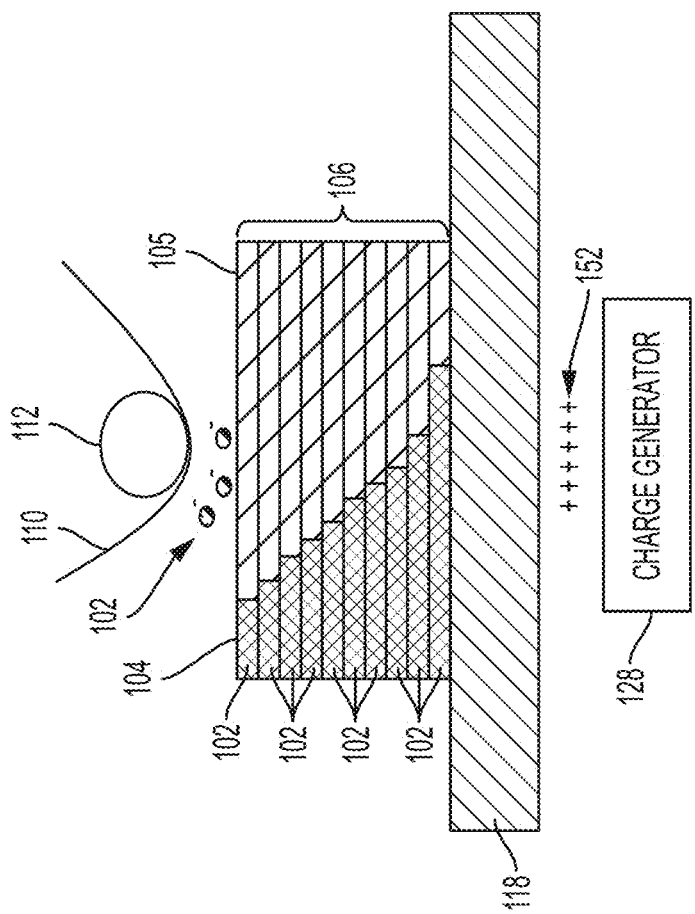
FIG. 14 is an expanded schematic diagram illustrating devices herein.

Thus, the processing in FIGS. 2-13 is repeated to fuse multiple developed layers 102 to the platen 118 (and to one another). FIG. 14 is an expanded diagram showing how the developed layers 102 may contain some of the build material 104 and some of the support material 105, and how the lowest developed layer 102 is joined to the platen 118, and how each successive developed layer 102 contacts and is joined to the immediately preceding adjacent developed layer 102 that is below to form a stack 106 of developed layers 102 on the platen 118. As noted above, the particles of build materials 104 and support material 105 within the developed layer 102 (shown as particles (not drawn to scale) in FIG. 14, using identification number 102) can be heated tacky particles of powder joining a heated tacky top developed layer 102, and/or can be electrostatically attracted particles attracted by the charge 152 generated by the charge generator 128.

Figure 15:
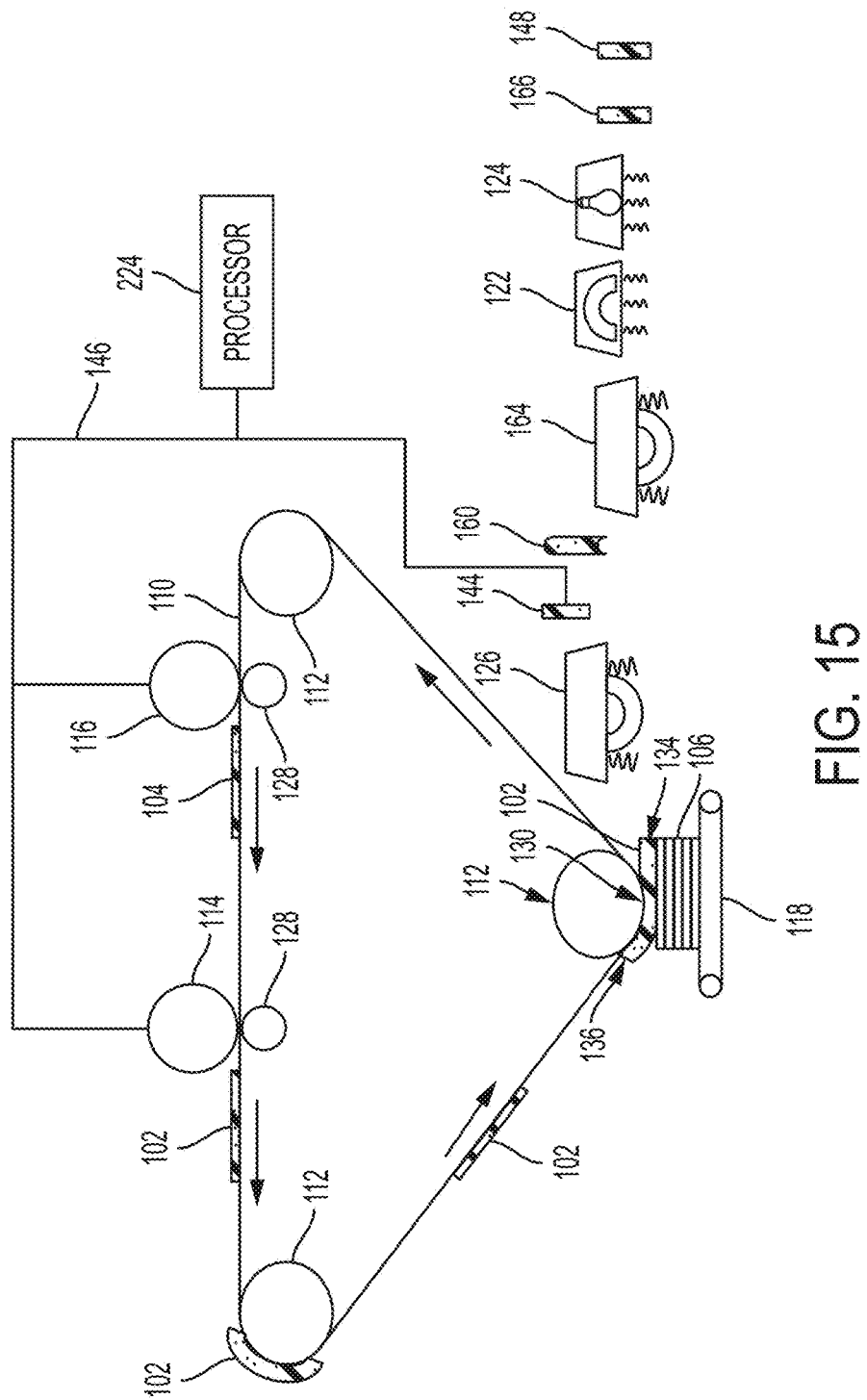
FIGS. 15-24 are schematic cross-section diagrams partially illustrating devices herein.
Figure 16:
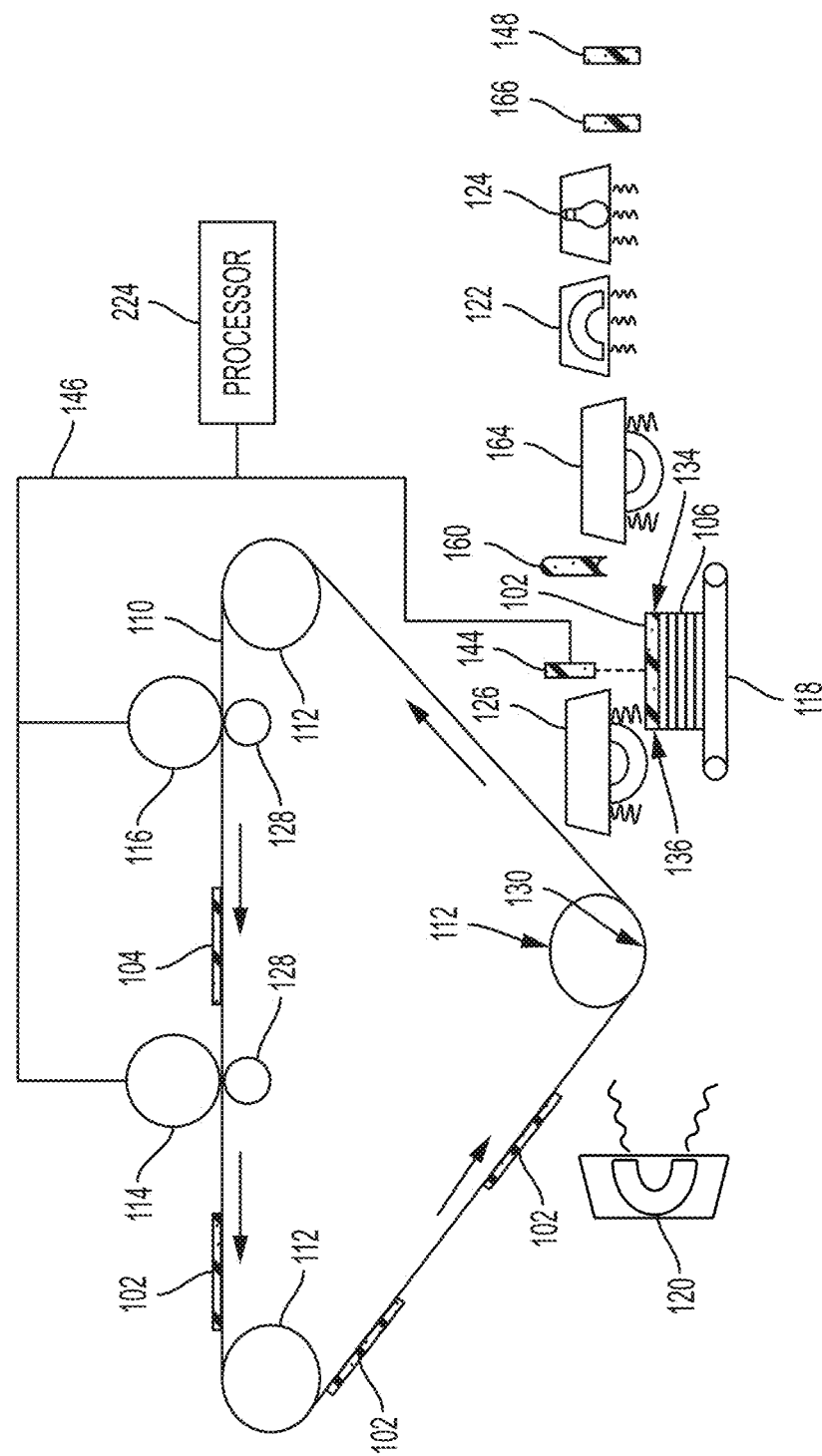
Figure 17:
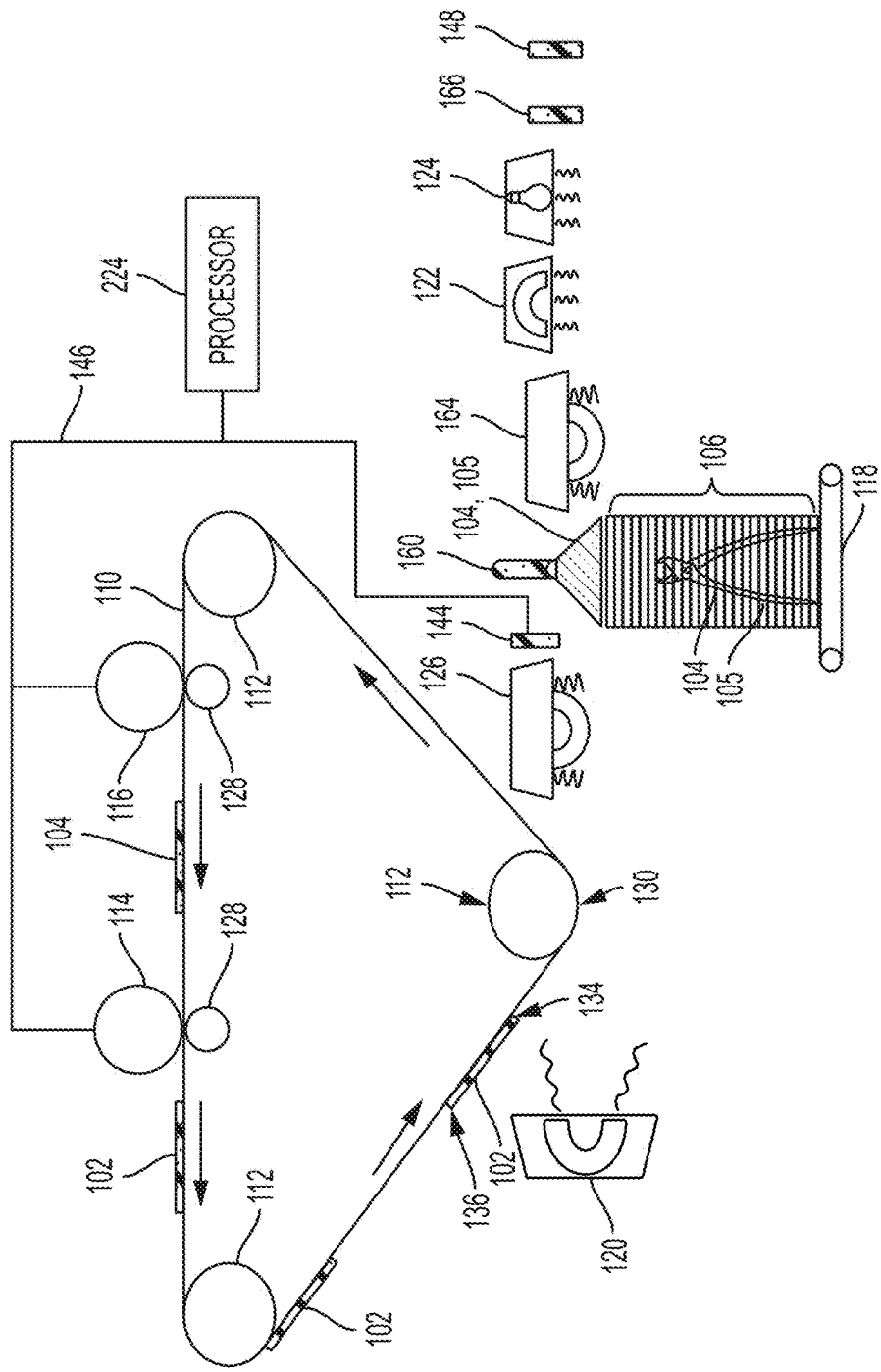

As the stack 106 of the developed layers 102 grows, additional developed layers 102 are formed on top of the stack 106, as shown in FIG. 15, and such additional developed layers 102 are fused by the fusing station 126 and the topography of only the top layer is measured by the sensor 144, as shown in FIG. 16, to allow the aerosol applicator 160 to propel build and support material to control the flatness of surface topology of the layers 102 in the freestanding stack 106 on the platen 118, as shown in FIG. 17. The topography measurement sensor 144 is calibrated to only measure the topography of the very top layer of the stack 106, so as to provide accurate topographical information of the layer 102 (which eventually results in a highly uniform layer 102 topography). In addition, FIG. 17 illustrates an overlay showing portions of support material 105 and build material 104 within the of freestanding stack 106. Such may or may not be visible, and is only illustrated to show one exemplary way in which such build and support materials may be arranged.

The platen 118 can move to any or all of the fusing station 126, the curing station 122, 124, the aerosol applicator 160, the additional fusing station 164, and the cooling station 166, after each time the ITB 110 transfers each of the developed layers 102 to the platen 118. In other alternatives, the platen 118 may only move to any or all of the fusing station 126, the curing station 122, 124, the aerosol applicator 160, the additional fusing station 164, and the cooling station 166 after a specific number (e.g., 2, 3, 4, etc.) of the developed layers 102 have been placed on the platen 118 to allow multiple developed layers 102 to be simultaneously fused, cured, leveled, cooled, etc.

Figure 18:
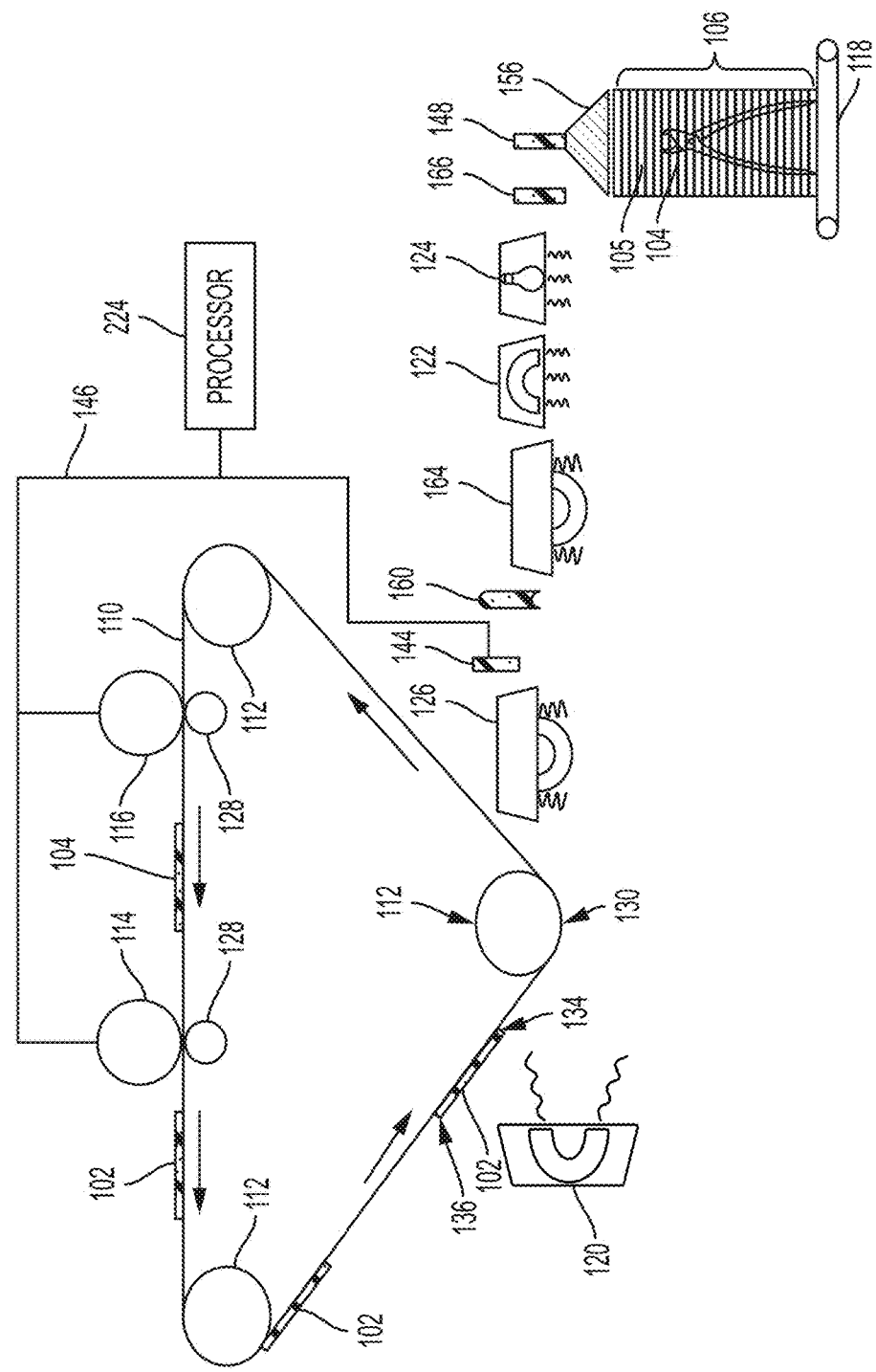
Figure 19:
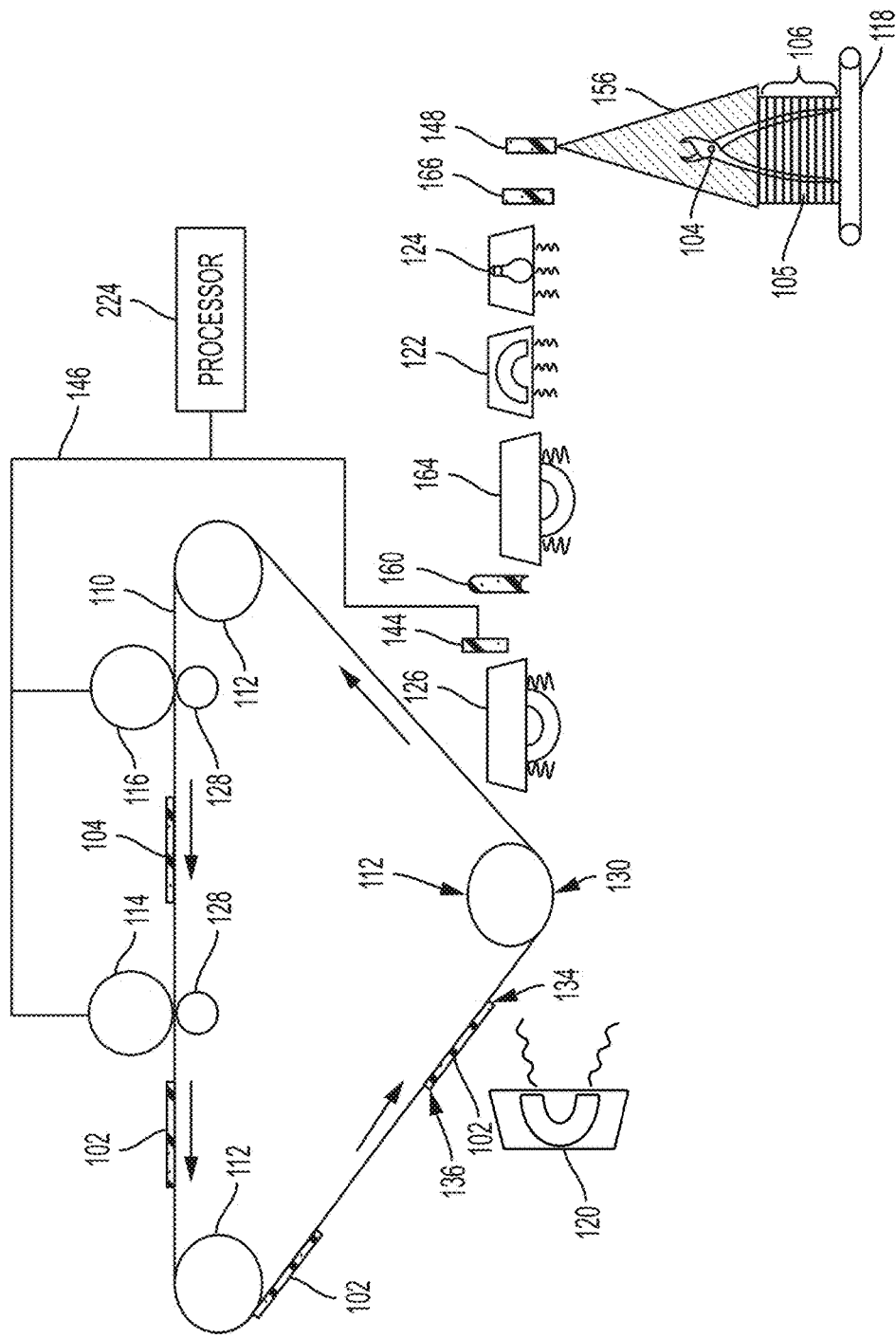
Figure 20:
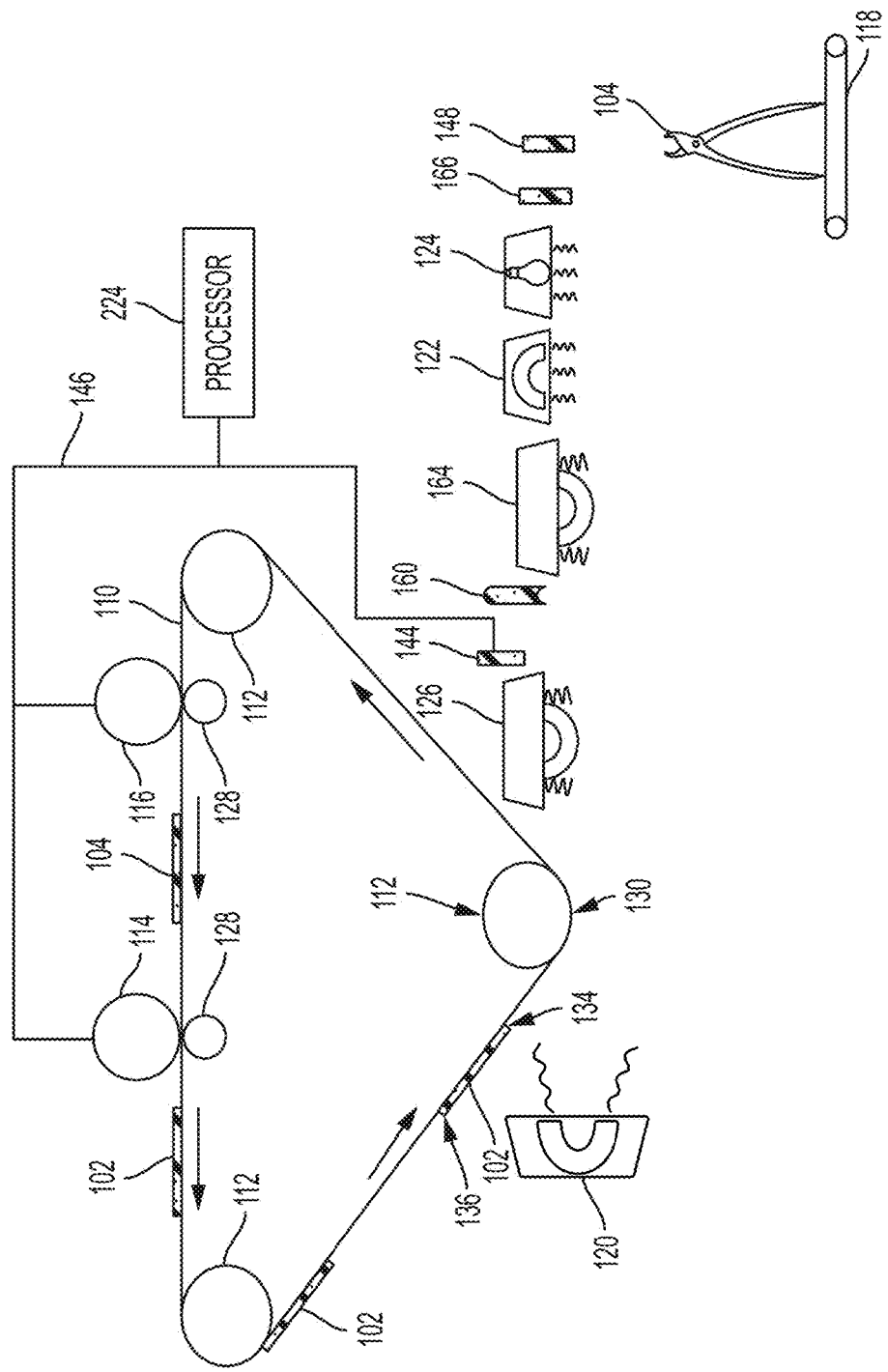

The 3-D structure of the freestanding stack 106 can be output to allow manual removal of the support material 105 using an external solvent bath; or processing can proceed as shown in FIGS. 18-20. More specifically, in FIG. 18, the support material removal station 148 is positioned to receive the now bonded 3-D structure of freestanding stack 106 on the platen 118. The support material removal station 148 applies a solvent 156 that dissolves the support material 105 without affecting the build material 104. Again, as noted above, the solvent utilized will depend upon the chemical makeup of the build material 104 and the support material 105. FIG. 19 illustrates the processing where about half of the support material 105 remains, and a portion of the build material 104 protrudes from the remaining stack of support material 105. FIG. 20 illustrates processing after the support material removal station 148 has applied sufficient solvent 156 to dissolve all the support material 105, leaving only the build material 104 remaining, which leave a completed 3-D structure made of only the build material 104.

Figure 21:
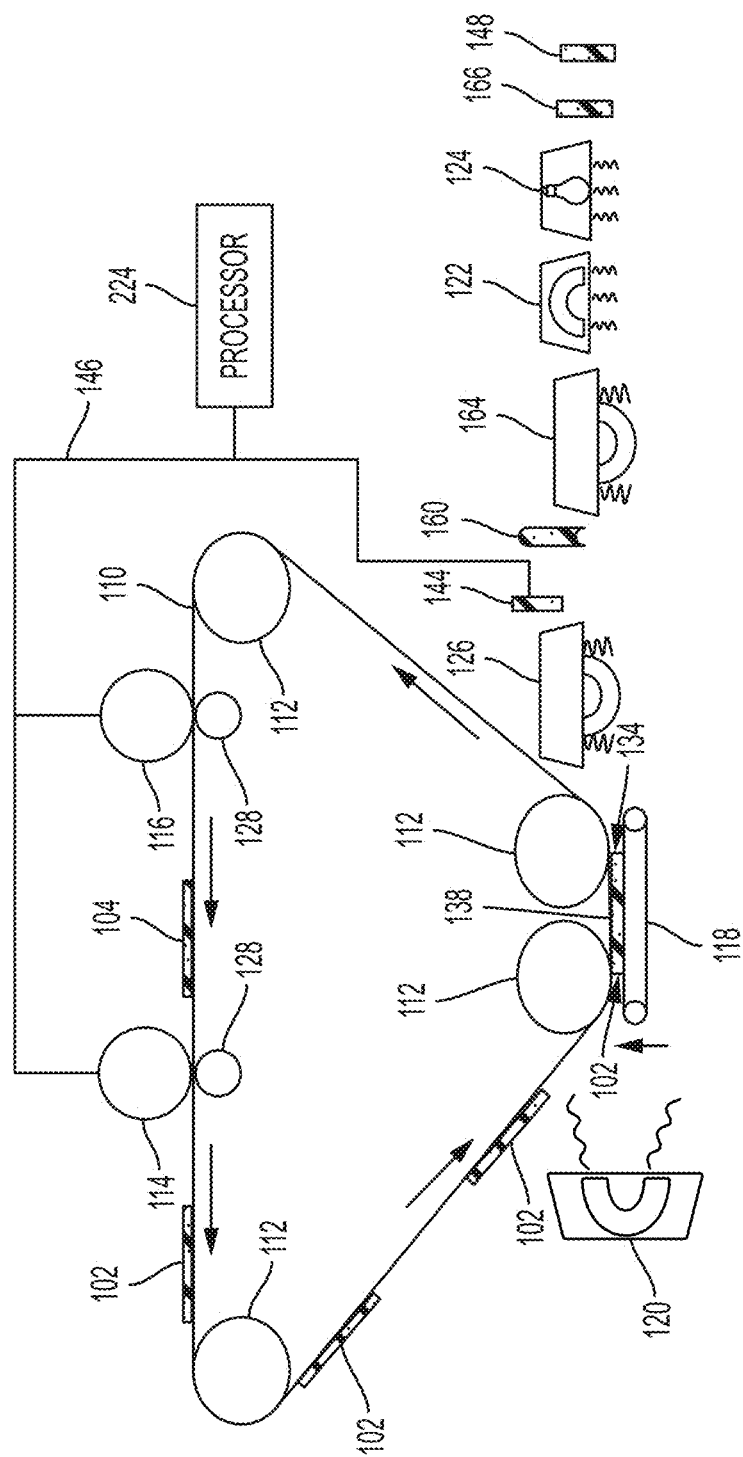
Figure 22:
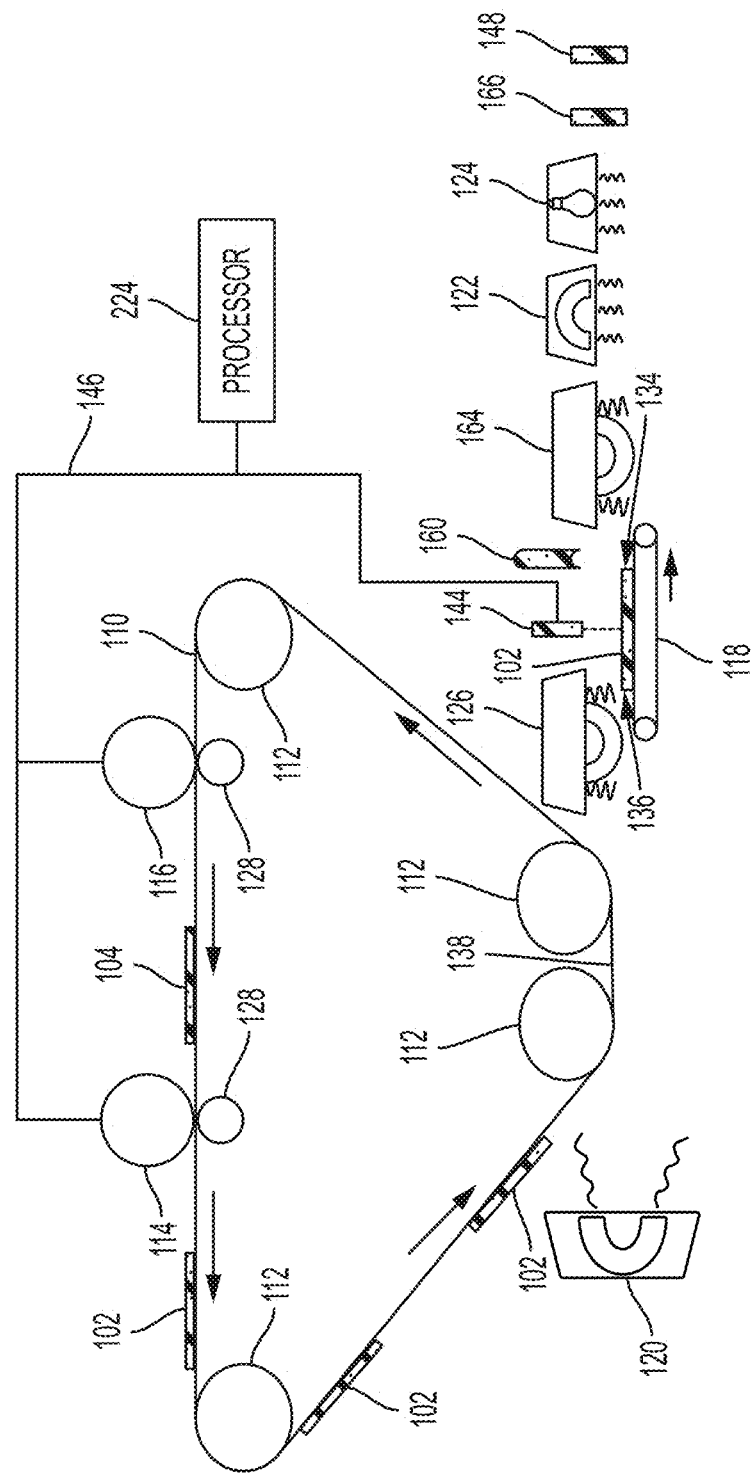
Figure 23:
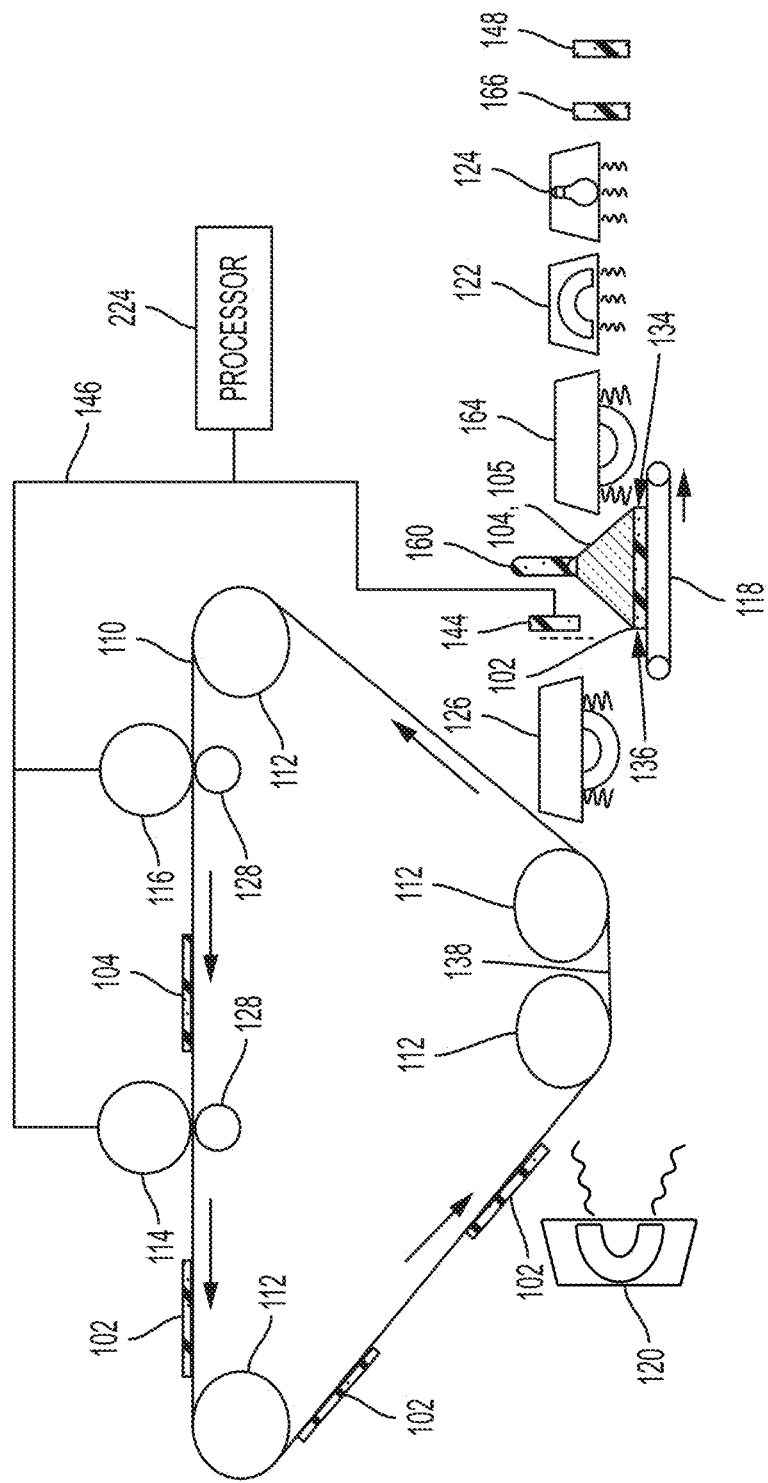

FIGS. 21-23 illustrate an alternative 3-D electrostatic printing structure herein which includes a planar transfuse station 138 in place of the transfuse nip 130 shown in FIG. 1. As shown in FIG. 21, the planar transfuse station 138 is a planar portion of the ITB 110 that is between rollers 112 and is parallel to the platen 118. As shown in FIG. 21, with this structure, when the platen 118 moves to contact the planar transfuse station 138, all of the developed layer 102 is transferred simultaneously to the platen 118 or partially formed stack 106, avoiding the rolling transfuses process shown in FIGS. 2 and 3. FIG. 22 illustrates the sensor 144 detecting the topography of the layer 102, and FIG. 23 illustrates the aerosol applicator 160 propelling build and support material 104, 105 to fill-in the depressions of the layer 102.

Figure 24:
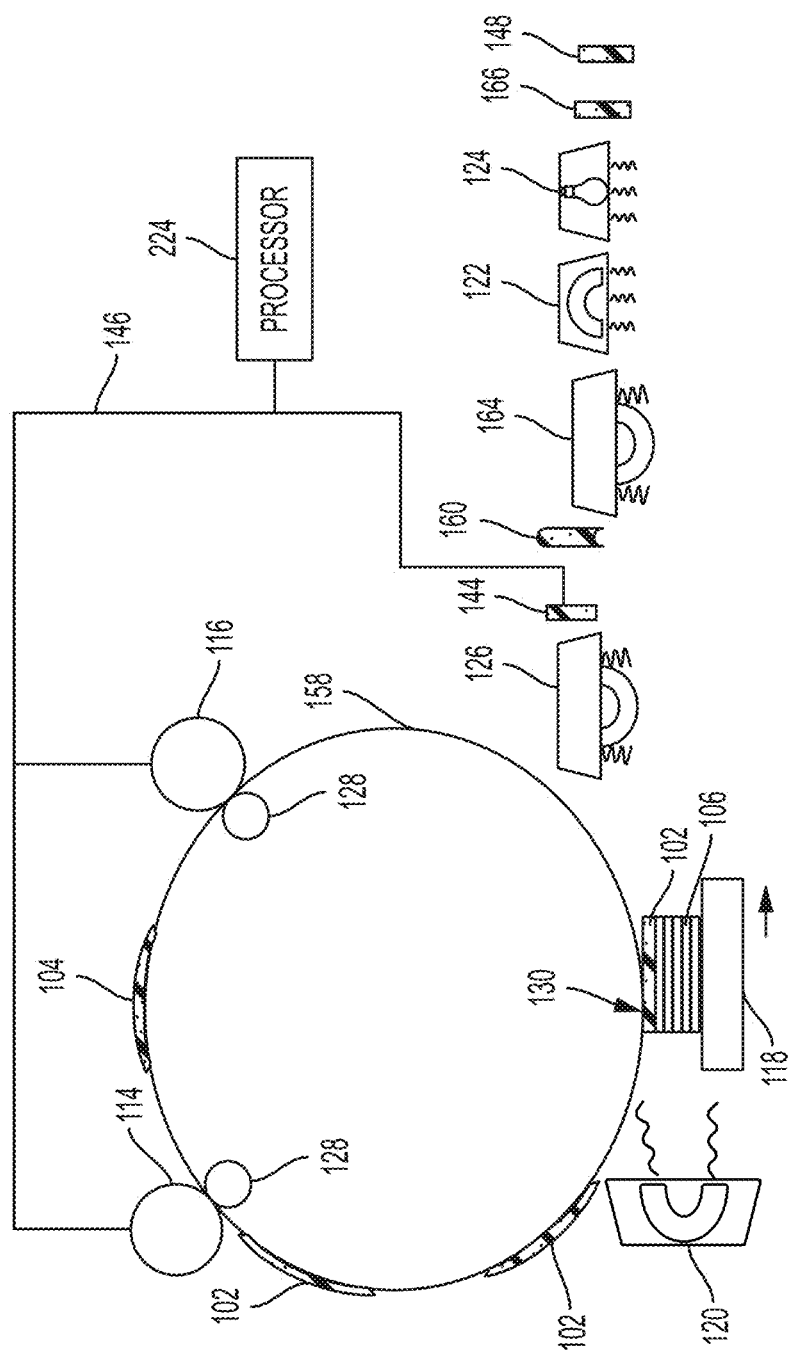

Alternatively, as shown in FIG. 24, a drum 158 could be used in place of the ITB 110, with all other components operating as described herein. Thus, the drum 158 could be an intermediate transfer surface receiving material from development stations 114, 116, as described above, or could be a photoreceptor and operate as the photoreceptor 256 described below operates, by maintaining a latent image of charge and receiving materials from development devices 254.

Figure 25:
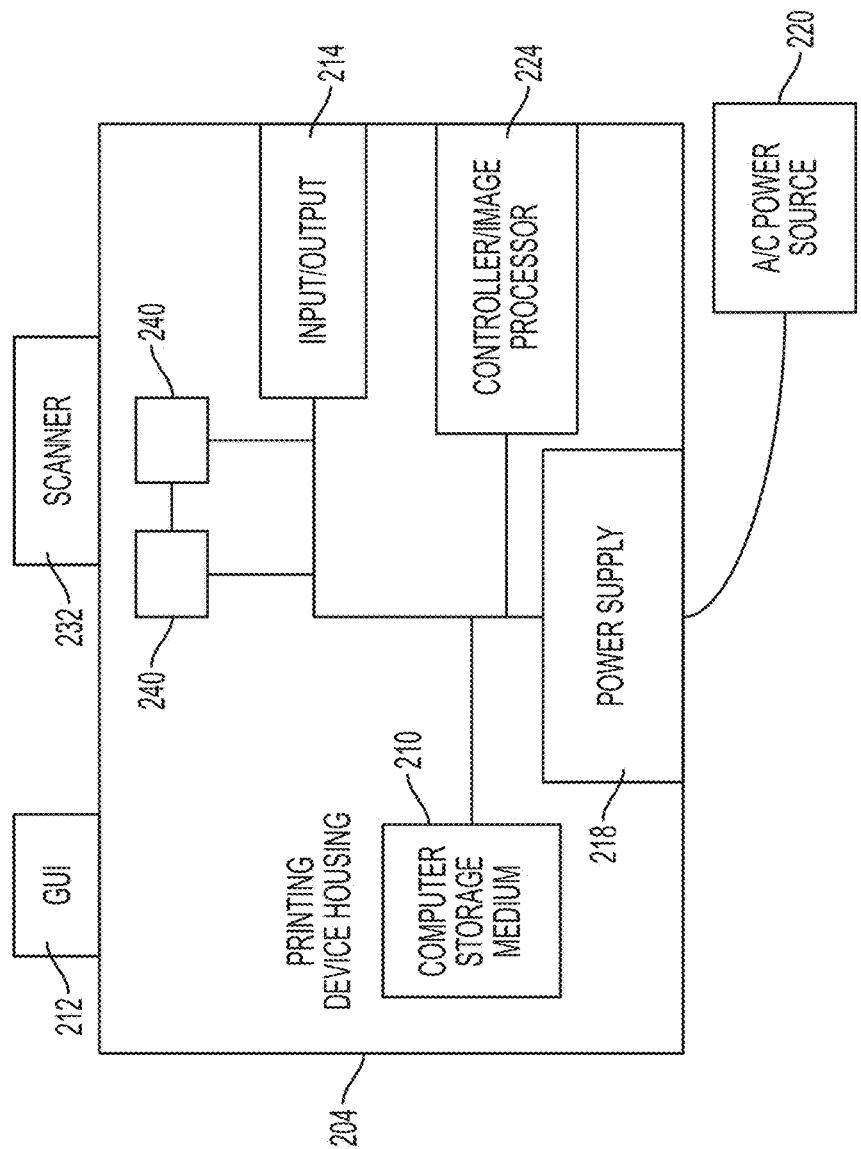
FIG. 25 is a schematic diagram illustrating a printing device herein.

FIG. 25 illustrates many components of 3-D printer structures 204 herein. The 3-D printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the 3-D printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 25, a body housing has one or more functional components that operate on power supplied from an alternating current (AC) source 220 by the power supply 218. The power supply 218 can comprise a common power conversion unit, power storage element (e.g., a battery, etc), etc.

The 3-D printing device 204 includes at least one marking device (printing engine(s)) 240 that deposits successive layers of build and support material on a platen as described above, and are operatively connected to a specialized image processor 224 (that is different than a general purpose computer because it is specialized for processing image data). Also, the printing device 204 can include at least one accessory functional component (such as a scanner 232) that also operates on the power supplied from the external power source 220 (through the power supply 218).

Figure 26:
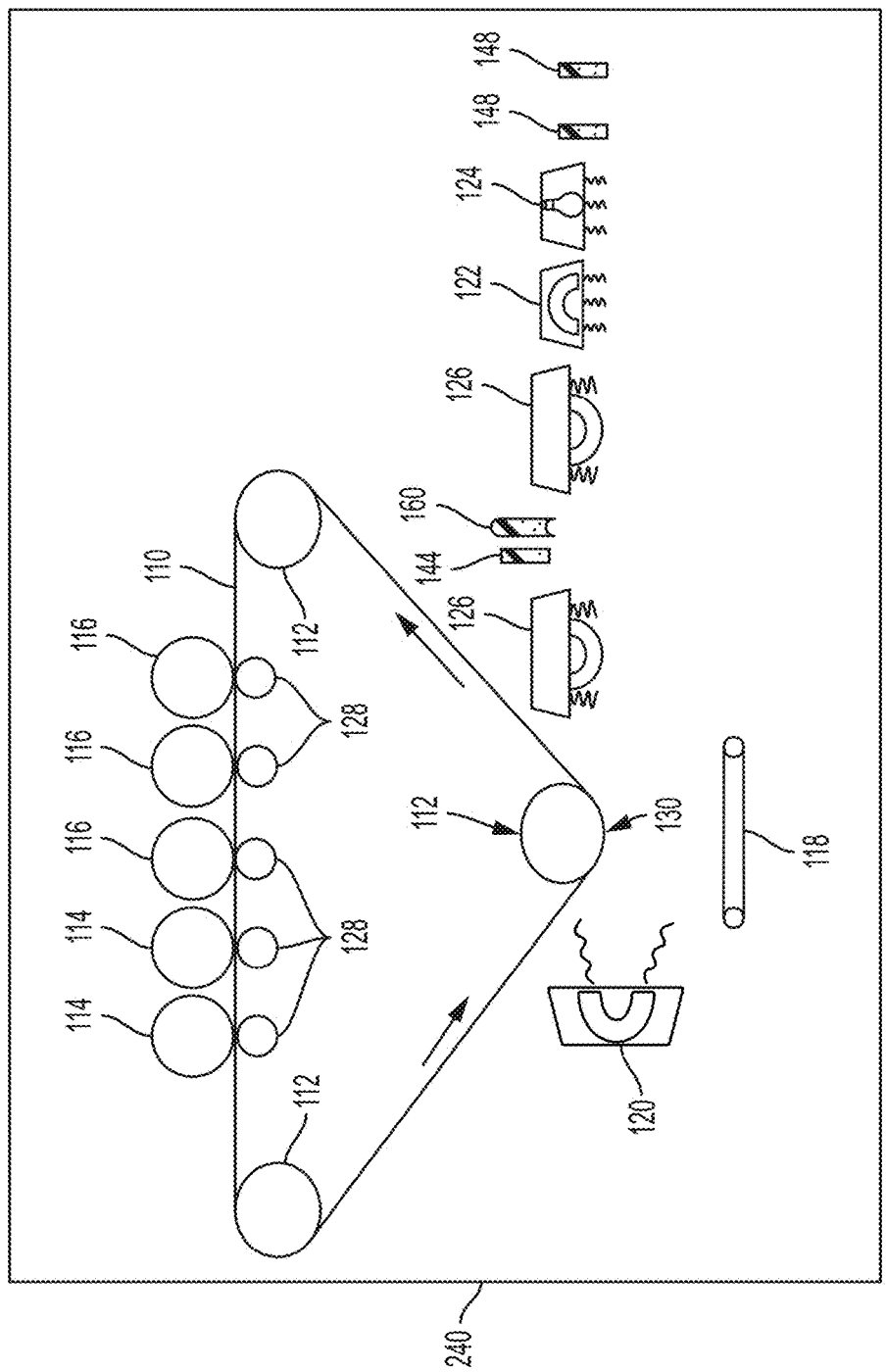
FIGS. 26 and 27 are schematic diagrams illustrating components of a printing device herein.

The one or more printing engines 240 are intended to illustrate any marking device that applies build and support materials (toner, etc.) whether currently known or developed in the future and can include, for example, devices that use an intermediate transfer belt 110 (as shown in FIG. 26). Thus, as shown in FIG. 26, each of the printing engine(s) 240 shown in FIG. 25 can utilize one or more potentially different (e.g., different color, different material, etc.) build material development stations 116, one or more potentially different (e.g., different color, different material, etc.) support material development stations 114, etc. The development stations 114, 116 can be any form of development station, whether currently known or developed in the future, such as individual electrostatic marking stations, individual inkjet stations, individual dry ink stations, etc. Each of the development stations 114, 116 transfers a pattern of material to the same location of the intermediate transfer belt 110 in sequence during a single belt rotation (potentially independently of a condition of the intermediate transfer belt 110) thereby, reducing the number of passes the intermediate transfer belt 110 must make before a full and complete image is transferred to the intermediate transfer belt 110. While FIG. 26 illustrates five development stations adjacent or in contact with a rotating belt (110), as would be understood by those ordinarily skilled in the art, such devices could use any number of marking stations (e.g., 2, 3, 5, 8, 11, etc.).

Figure 27:
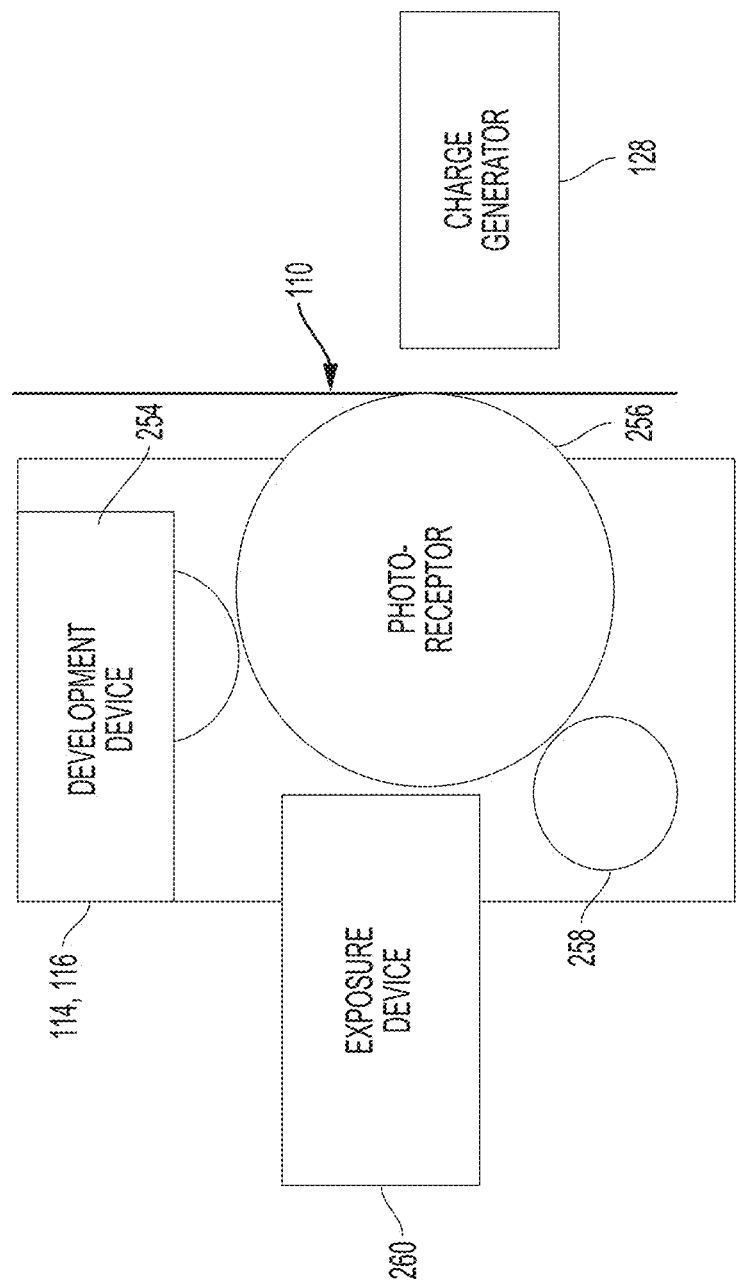

One exemplary individual electrostatic development station 114, 116 is shown in FIG. 27 positioned adjacent to (or potentially in contact with) intermediate transfer belt 110. Each of the individual electrostatic development stations 114, 116 includes its own charging station 258 that creates a uniform charge on an internal photoreceptor 256, an internal exposure device 260 that patterns the uniform charge into a latent image of charge, and an internal development device 254 that transfers build or support material to the photoreceptor 256 in a pattern matching the charge latent image. The pattern of build or support material is then drawn from the photoreceptor 256 to the intermediate transfer belt 110 by way of an opposite charge of the intermediate transfer belt 110 relative to the charge of the build or support material, that is usually created by a charge generator 128 on the opposite side of the intermediate transfer belt 110.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

As shown in U.S. Pat. No. 8,488,994, an additive manufacturing system for printing a 3-D part using electrophotography is known. The system includes a photoconductor component having a surface, and a development station, where the development station is configured to developed layers of a material on the surface of the photoconductor component. The system also includes a transfer medium configured to receive the developed layers from the surface of the rotatable photoconductor component, and a platen configured to receive the developed layers from the transfer component in a layer-by-layer manner to print the 3-D part from at least a portion of the received layers.

With respect to UV curable toners, as disclosed in U.S. Pat. No. 7,250,238 it is known to provide a UV curable toner composition, as are methods of utilizing the UV curable toner compositions in printing processes. U.S. Pat. No. 7,250,238 discloses various toner emulsion aggregation processes that permit the generation of toners that in embodiments can be cured, that is by the exposure to UV radiation, such as UV light of has about 100 nm to about 400 nm. In U.S. Pat. No. 7,250,238, the toner compositions produced can be utilized in various printing applications such as temperature sensitive packaging and the production of foil seals. In U.S. Pat. No. 7,250,238 embodiments relate to a UV curable toner composition comprised of an optional colorant, an optional wax, a polymer generated from styrene, and acrylate selected from the group consisting of butyl acrylate, carboxyethyl acrylate, and a UV light curable acrylate oligomer. Additionally, these aspects relate to a toner composition comprised of a colorant such as a pigment, an optional wax, and a polymer generated from a UV curable cycloaliphatic epoxide.

Moreover, U.S. Pat. No. 7,250,238 discloses a method of forming a UV curable toner composition comprising mixing a latex containing a polymer formed from styrene, butyl acrylate, a carboxymethyl acrylate, and a UV curable acrylate with a colorant and wax; adding flocculant to this mixture to optionally induce aggregation and form toner precursor particles dispersed in a second mixture; heating the toner precursor particles to a temperature equal to or higher than the glass transition temperature (Tg) of the polymer to form toner particles; optionally washing the toner particles; and optionally drying the toner particles. A further aspect relates to the toner particles produced by this method.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

For the purposes of this invention, the term fixing means the drying, hardening, polymerization, crosslinking, binding, or addition reaction or other reaction of the coating. In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A three-dimensional (3-D) printer comprising:
   an intermediate transfer belt (ITB);
   a build material development station positioned to electrostatically transfer build material to said ITB;
   a support material development station positioned to electrostatically transfer support material to said ITB, said build material development station and said support material development station transfer layers of said build material and said support material to said ITB;
   a platen having a flat surface positioned to repeatedly contact said 1 TB, said platen moves relative to said ITB, said ITB transfers a layer of said build material and said support material to said flat surface of said platen each time said platen contacts one of said layers on said ITB to successively form a freestanding stack of said layers on said flat surface of said platen;
   a sensor positioned to generate a topographic measurement of said layer on said platen;
   a feedback loop electrically connected to said sensor; and
   an aerosol applicator positioned to propel said build material and said support material on to said layer on said platen,
   said aerosol applicator selectively propels different amounts of said build material and said support material to different locations of said layers, based on said topographic measurement from said sensor through said feedback loop, to adjust the amount and location of said build material and said support material propelled onto said layer, to control flatness of surface topology of said layers in said freestanding stack on said platen, and said sensor detects depressions in surface topology of said layers and supplies depths and locations of said depressions to said aerosol applicator through said feedback loop.

2. The 3-D printer according to claim 1, said aerosol applicator comprises an array of gas jets.

3. The 3-D printer according to claim 1, said aerosol applicator comprises electrical field gates that control the amount of said build material and said support material propelled out of said aerosol applicator.

4. The 3-D printer according to claim 1, said aerosol applicator selectively propels different amounts of said build material and said support material to different locations of said layers to fill in depressions of said surface topology of said layers to make said surface topology of said layers flat and parallel to said flat surface of said platen.

5. The 3-D printer according to claim 4, said sensor detects said depressions and supplies depths and locations of said depressions to said aerosol applicator through said feedback loop.

6. The 3-D printer according to claim 1, said aerosol applicator comprises a venturi narrowed tubular jet body driven by pressurized gas.

7. The 3-D printer according to claim 1, further comprising a support material removal station positioned to receive said freestanding stack from said platen, said support material removal station removes a second material without affecting a first material to leave a 3-D structure made of only said first material.

8. A three-dimensional (3-D) printer comprising:
an intermediate transfer belt (ITB);
a build material development station positioned to electrostatically transfer build material to said ITB;
a support material development station positioned to electrostatically transfer support material to said ITB, said build material development station and said support material development station transfer layers of said build material and said support material to said ITB;
a platen having a flat surface positioned to repeatedly contact said ITB, said platen moves relative to said ITB, said ITB transfers a layer of said build material and said support material to said flat surface of said platen each time said platen contacts one of said layers on said ITB to successively form a freestanding stack of said layers on said flat surface of said platen;
a sensor positioned to generate a topographic measurement of said layer on said platen;
a feedback loop electrically connected to said sensor; and
an aerosol applicator positioned to propel said build material and said support material on to said layer on said platen,
said aerosol applicator selectively propels different amounts of said build material and said support material to different locations of said layers, based on said topographic measurement from said sensor through said feedback loop, to adjust the amount and location of said build material and said support material propelled on to said layer, to fill in depressions of surface topology of said layers and to control flatness of said surface topology of said layers in said freestanding stack on said platen, and
said sensor detects said depressions and supplies depths and locations of said depressions to said aerosol applicator through said feedback loop.

9. The 3-D printer according to claim 8, said aerosol applicator comprises an array of gas jets.

10. The 3-D printer according to claim 8, said aerosol applicator comprises electrical field gates that control the amount of said build material and said support material propelled out of said aerosol applicator.

11. The 3-D printer according to claim 8, said aerosol applicator selectively propels different amounts of said build material and said support material to different locations of said layers to fill in depressions of said surface topology of said layers to make said surface topology of said layers flat and parallel to said flat surface of said platen.

12. The 3-D printer according to claim 8, said aerosol applicator comprises a venturi narrowed tubular jet body driven by pressurized gas.

13. The 3-D printer according to claim 8, further comprising a support material removal station positioned to receive said freestanding stack from said platen, said support material removal station removes a second material without affecting a first material to leave a 3-D structure made of only said first material.

* * * * *